(12) United States Patent
Takata

(10) Patent No.: US 8,430,519 B2
(45) Date of Patent: Apr. 30, 2013

(54) LIGHTING DEVICE, DISPLAY DEVICE AND TELEVISION RECEIVER

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 210 days.

(21) Appl. No.: 13/063,288

(22) PCT Filed: Jul. 8, 2009

(86) PCT No.: PCT/JP2009/062431
§ 371 (c)(1),
(2), (4) Date: Mar. 10, 2011

(87) PCT Pub. No.: WO2010/035566
PCT Pub. Date: Apr. 1, 2010

(65) Prior Publication Data
US 2011/0205448 A1    Aug. 25, 2011

(30) Foreign Application Priority Data

Sep. 23, 2008 (JP) .................................. 2008-243470

(51) Int. Cl.
*G09F 13/04* (2006.01)
*G09F 13/08* (2006.01)
*F21V 7/04* (2006.01)

(52) U.S. Cl.
USPC .......... 362/97.1; 362/97.3; 362/617; 362/620

(58) Field of Classification Search ................. 362/97.1, 362/97.3, 617, 620
See application file for complete search history.

(56) References Cited

U.S. PATENT DOCUMENTS

| | | | | |
|---|---|---|---|---|
| 7,068,332 B2 * | 6/2006 | Liu et al. | | 349/64 |
| 7,152,988 B2 * | 12/2006 | Hung | | 362/97.2 |
| 7,455,416 B2 * | 11/2008 | Chen | | 362/85 |
| 7,651,241 B2 * | 1/2010 | Lee | | 362/223 |
| 7,726,828 B2 * | 6/2010 | Sato | | 362/97.3 |
| 2005/0104073 A1 | 5/2005 | Chou | | |

FOREIGN PATENT DOCUMENTS

| JP | 2005-148731 A | 6/2005 |
|---|---|---|
| JP | 2007-178836 A | 7/2007 |

OTHER PUBLICATIONS

Official Communication issued in International Patent Application No. PCT/JP2009/062431, mailed on Oct. 20, 2009.

\* cited by examiner

*Primary Examiner* — David J Makiya
(74) *Attorney, Agent, or Firm* — Keating & Bennett, LLP

(57) ABSTRACT

A lighting device 12 includes at least one point light source 17, an optical member 15a provided on a light output side of the lighting device 12 from the point light source 17. The optical member 15a is formed of a member having a substantially uniform light reflectance. A first light reflecting portion 31 is formed on a portion of the optical member 15a that overlaps the point light source 17, and the first light reflecting portion 31 reflects light from the point light source 17. A second light reflecting portion 30a, 23 is provided to reflect the light that is reflected by the first light reflecting portion 31 to be directed to the first light reflecting portion 31.

20 Claims, 31 Drawing Sheets

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal panel included in a liquid crystal display device does not emit light, and thus a backlight device is required as a separate lighting device. The backlight device is arranged behind the liquid crystal panel (i.e., on a side opposite from a display surface side). It includes a chassis having an opening on a liquid crystal panel side, a plurality of LEDs (light emitting diodes) accommodated in the chassis as light sources, and a light guide plate and the like that efficiently guides light emitted from the LEDs to the liquid crystal panel.

In such a backlight device, brightness may be remarkably different in a portion in which the LEDs are arranged and a portion in which no LED is arranged. Therefore, the point light emitted from each LED is converted to planer light by an optical member such as the light guide plate to obtain uniform illumination light. A generally known method for obtaining uniform illumination is disclosed in Patent Document 1.
[Patent Document 1] Japanese Unexamined Patent Publication No. 2007-178836

PROBLEM TO BE SOLVED BY THE INVENTION

In the lighting device disclosed in Patent Document 1, the prisms are formed on a surface of the light guide plate facing the LEDs. The angle of each prism increases as it gets farther from the light emission center of the point light source. Accordingly, the light emitted from each LED is dispersed in a wide area by the prisms and no empty area in which the light is not directed is generated. This achieves a uniform illumination distribution in an entire area of the light guide plate.

However, in the configuration disclosed in Patent Document 1, relative position relation between each LED and each prism above the LED is not defined and each prism is not necessarily provided right above each LED. Therefore, light emitted from the LED is not necessarily dispersed by the corresponding prism and directed to the portion in which no LED is arranged. Especially, if the number of LEDs decreases for a cost reduction and power saving, an interval between the LEDs is relatively increased. It is required to sufficiently and adequately direct the light emitted from the LEDs to the portion in which no LED is arranged.

DISCLOSURE OF THE PRESENT INVENTION

The present invention was made in view of the foregoing circumstances. An object of the present invention is to provide a lighting device in which light emitted from a point light source is effectively used to ensure uniform illumination brightness and achieve a cost reduction and power saving. Another object of the present invention is to provide a display device including such a lighting device and a television receiver including such a display device.

MEANS FOR SOLVING THE PROBLEM

To solve the above problem, a lighting device of the present invention includes at least one point light source, and an optical member provided on a light output side of the lighting device from the point light source. The optical member is formed of a member having a substantially uniform light reflectance. A first light reflecting portion is formed on a portion of the optical member that overlaps the point light source. The first light reflecting portion reflects light from the point light source. A second light reflecting portion is further provided to reflect the light that is reflected by the first light reflecting portion to be directed to the first light reflecting portion.

According to such a configuration, the first light reflecting portion is formed on a portion of the optical member that overlaps the point light source, that is a portion that light emitted from the point light source easily reaches. Therefore, most of the light emitted from the point light source and reaches the optical member reflects off the first light reflecting portion (does not pass thorough the first light reflecting portion), and the brightness of illumination light (light emitted from the optical member and irradiated to an object that is to be illuminated) is suppressed with respect to the light emission amount from the point light source. The light reflecting off the first reflecting portion reflects off the second reflecting portion and the light could be directed to the portion of the optical member that does not overlap the point light source. The light reaching the portion of the optical member that does not overlap the point light source is output from the portion of the optical member that does not overlap the point light source.

Accordingly, the light emitted from the point light source reflects off the first light reflecting portion to direct to the portion of the optical member that does not overlap the point light source. This compensates for the brightness of the portions where no point light source is arranged. The optical member where the first light reflecting portion is formed is formed of a member having a substantially uniform light transmission. Therefore, the light amount passing through the optical member (light amount emitted from the optical member) is controlled only by changing the arrangement pattern of the first light reflecting portion. Accordingly, uniform light brightness can be easily obtained.

Especially, the optical member is arranged to face the point light source such that any other members are not arranged between the optical member and the point light source. Accordingly, it is prevented that light emitted from the point light source is refracted by other member. Accordingly, it is prevented that light emitted from the point light source is output without being reflected by the first light reflecting portion. The effects of the first light reflecting portion can be surely obtained.

The second reflecting portion may be formed on the optical member or may be formed independently of the optical member.

BEST MODE FOR CARRYING OUT THE INVENTION

First Embodiment

The first embodiment of the present invention will be explained with reference to FIGS. 1 to 7.

First, a construction of a television receiver TV including a liquid crystal display device 10 will be explained.

Figure 1:
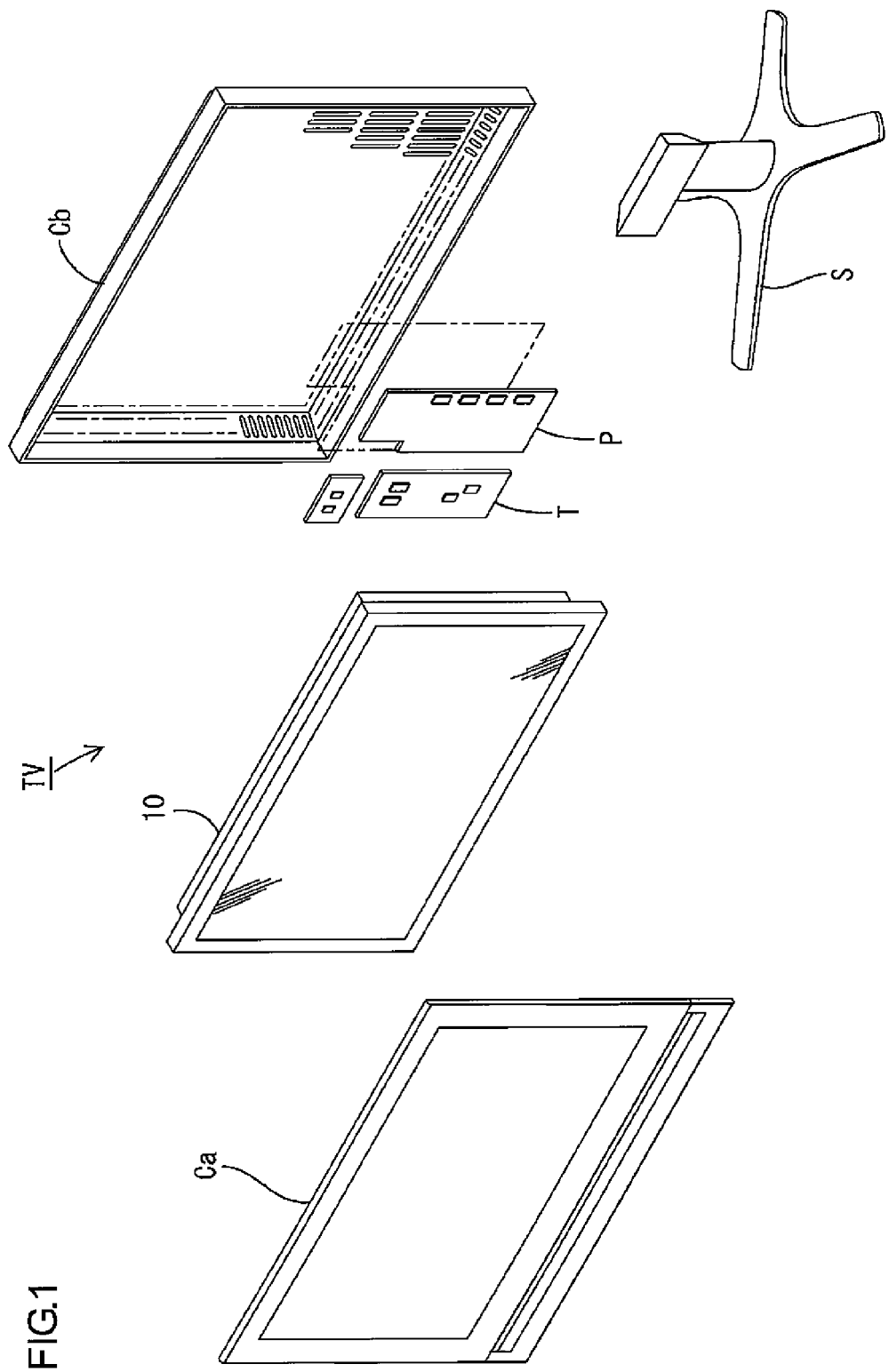
FIG. 1 is an exploded perspective view illustrating a construction of a television receiver according to a first embodiment of the present invention.
Figure 2:
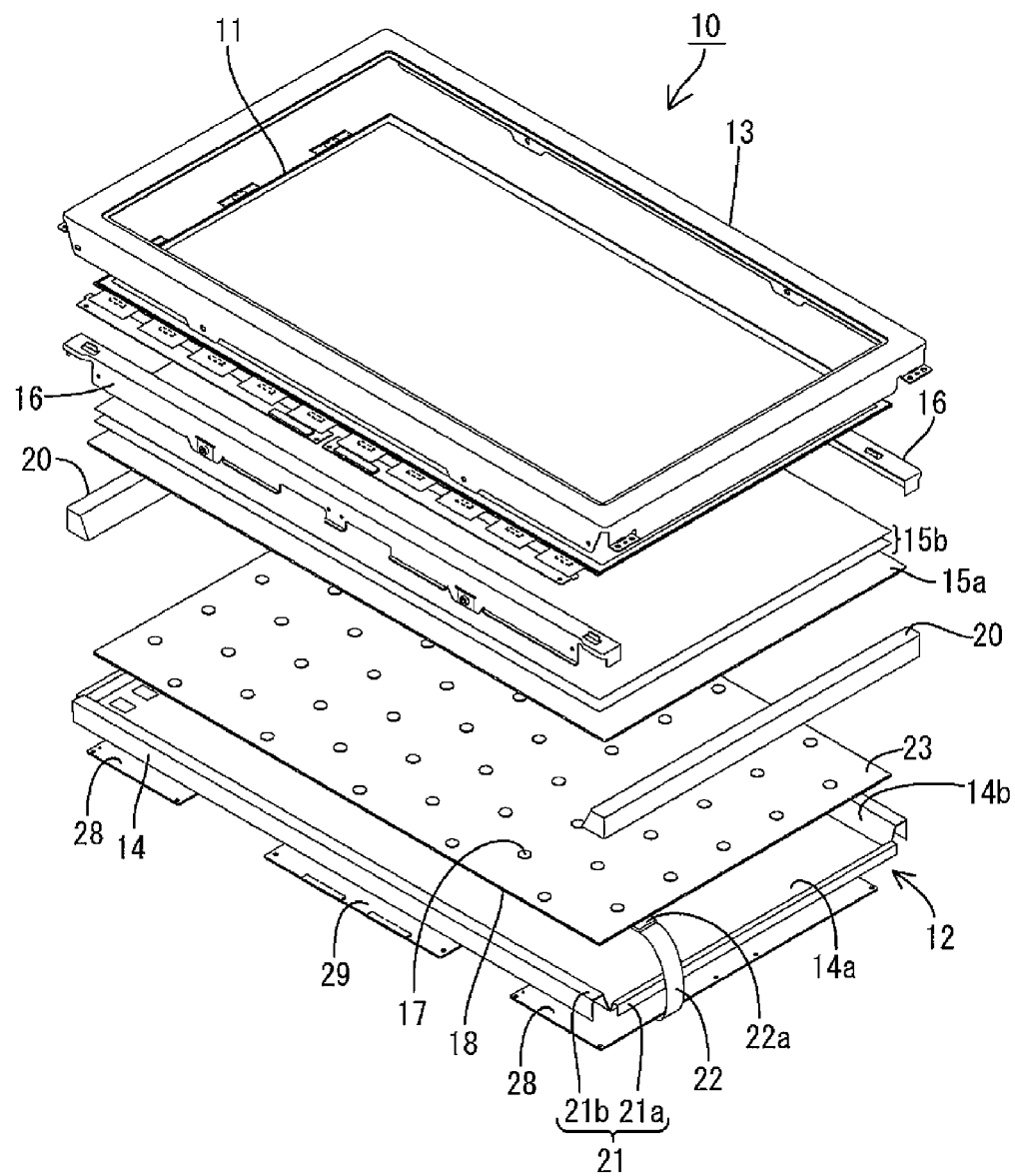
FIG. 2 is an exploded perspective view illustrating a general construction of a liquid crystal display device provided in the television receiver.
Figure 3:
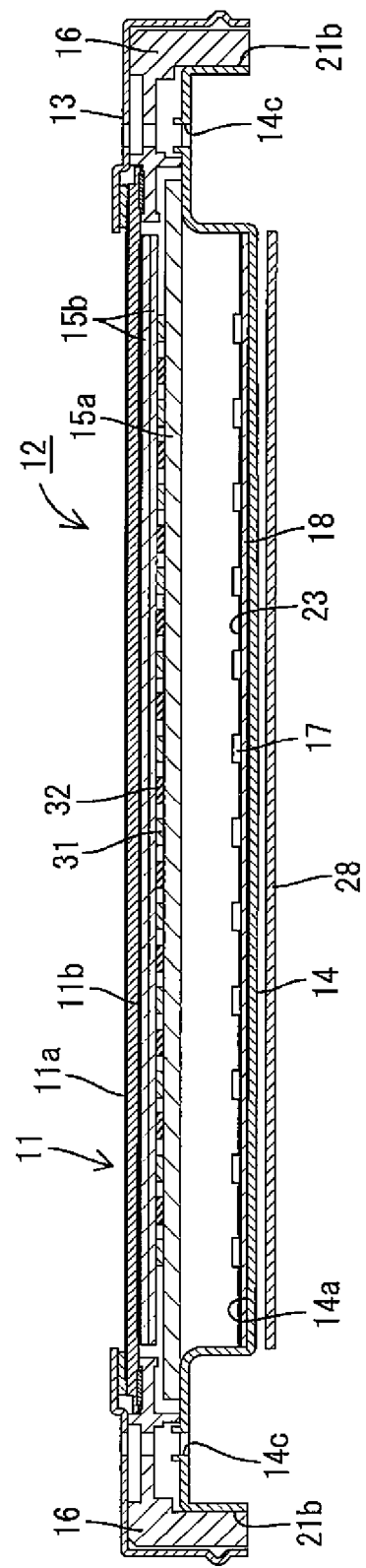
FIG. 3 is a cross-sectional view of the liquid crystal display device in FIG. 2 along the short-side direction.
Figure 4:
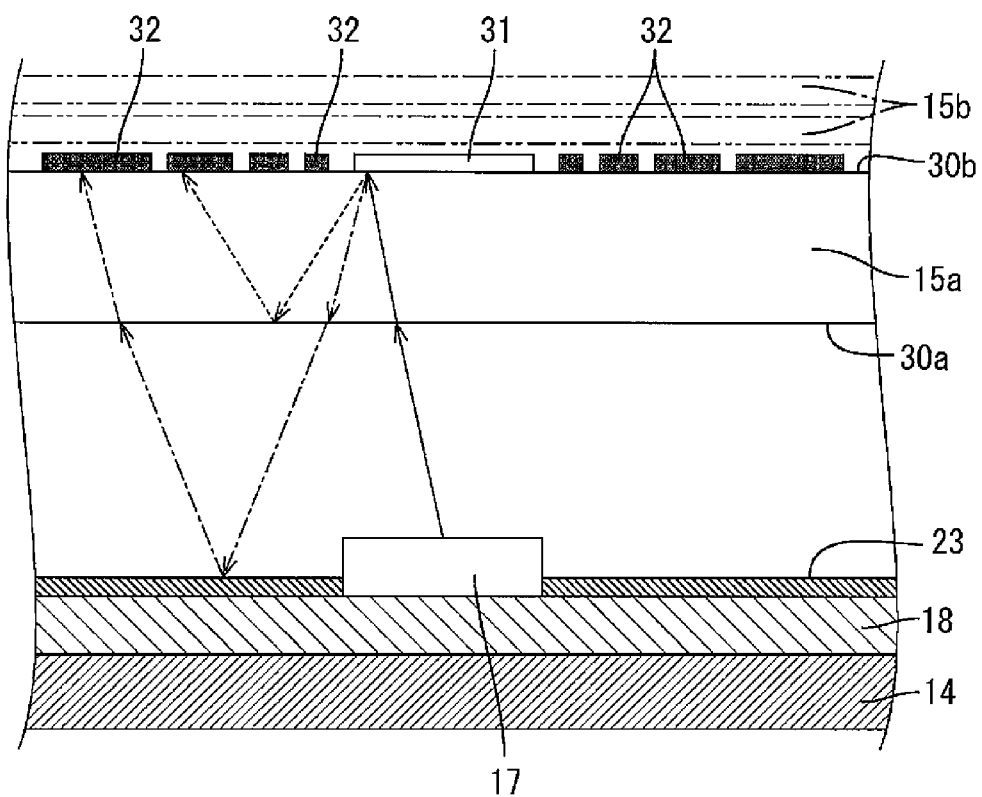
FIG. 4 is a typical view explaining an operation of a light reflecting portion and a light scattering portion formed on the light guide plate of the liquid crystal display device in FIG. 2.
Figure 5:
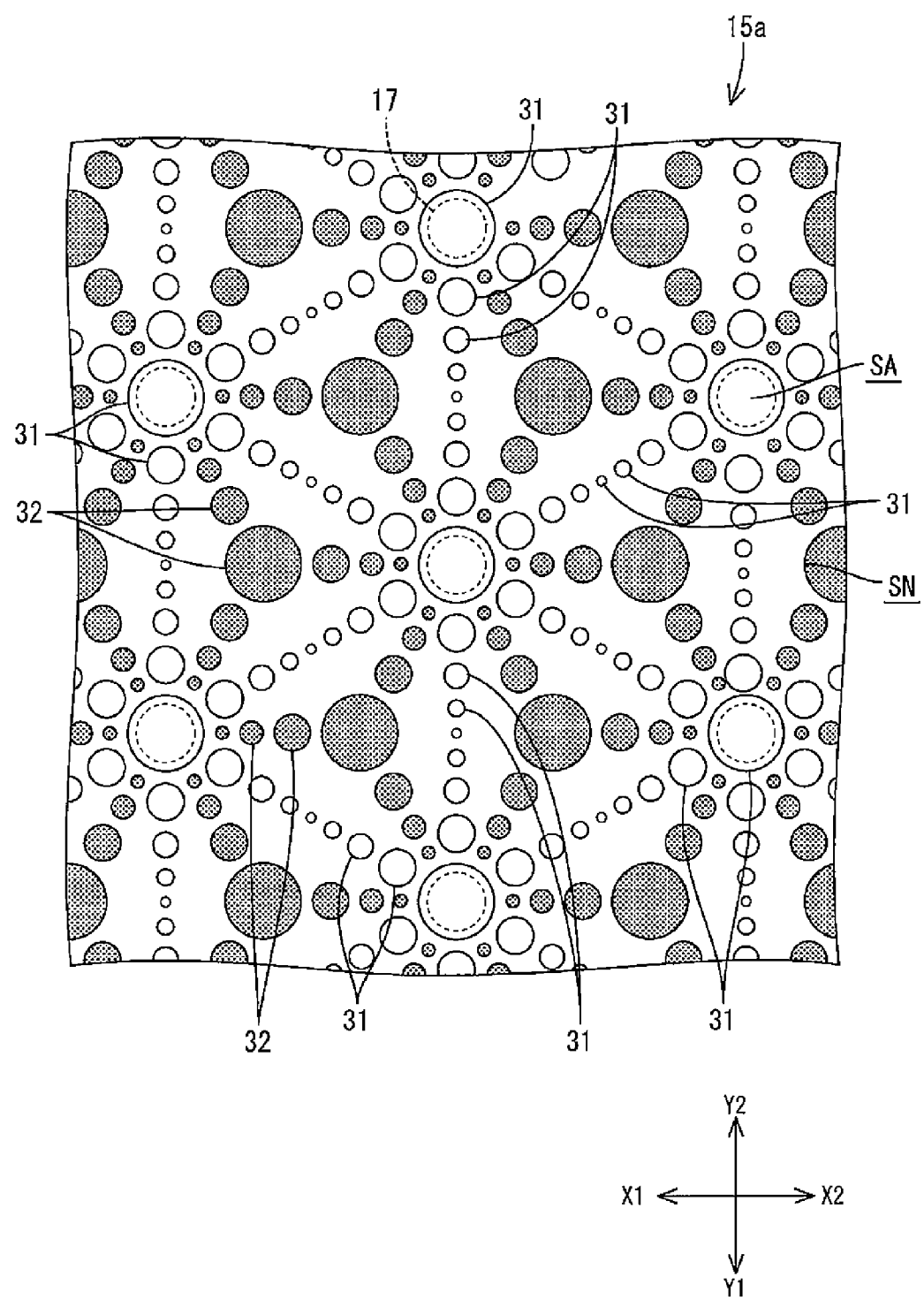
FIG. 5 is a plan view illustrating arrangement of the light reflecting portions and the light scattering portions formed on the light guide plate of the liquid crystal display device in FIG. 2.
Figure 6:
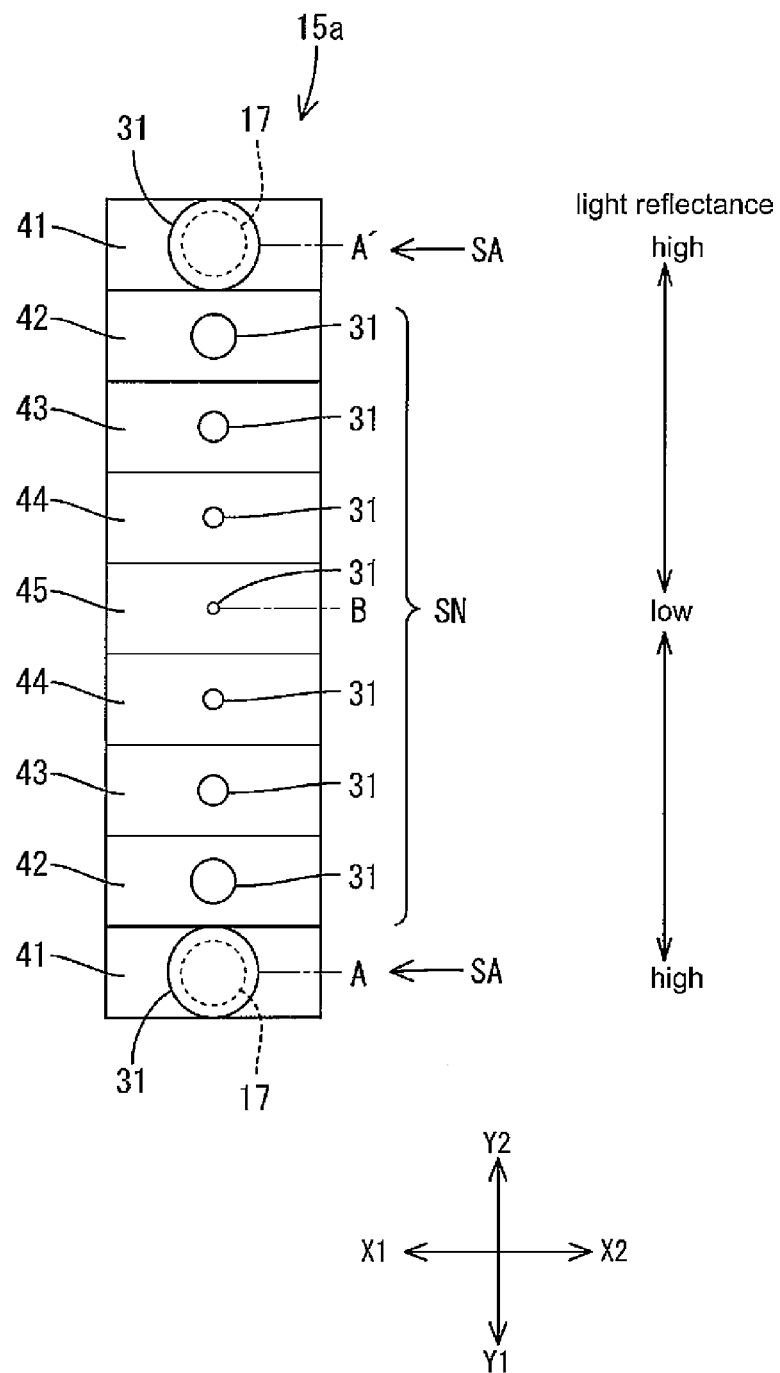
FIG. 6 is a plan view illustrating a light reflectance distribution of the light guide plate of the liquid crystal display device in FIG. 2.
Figure 7:
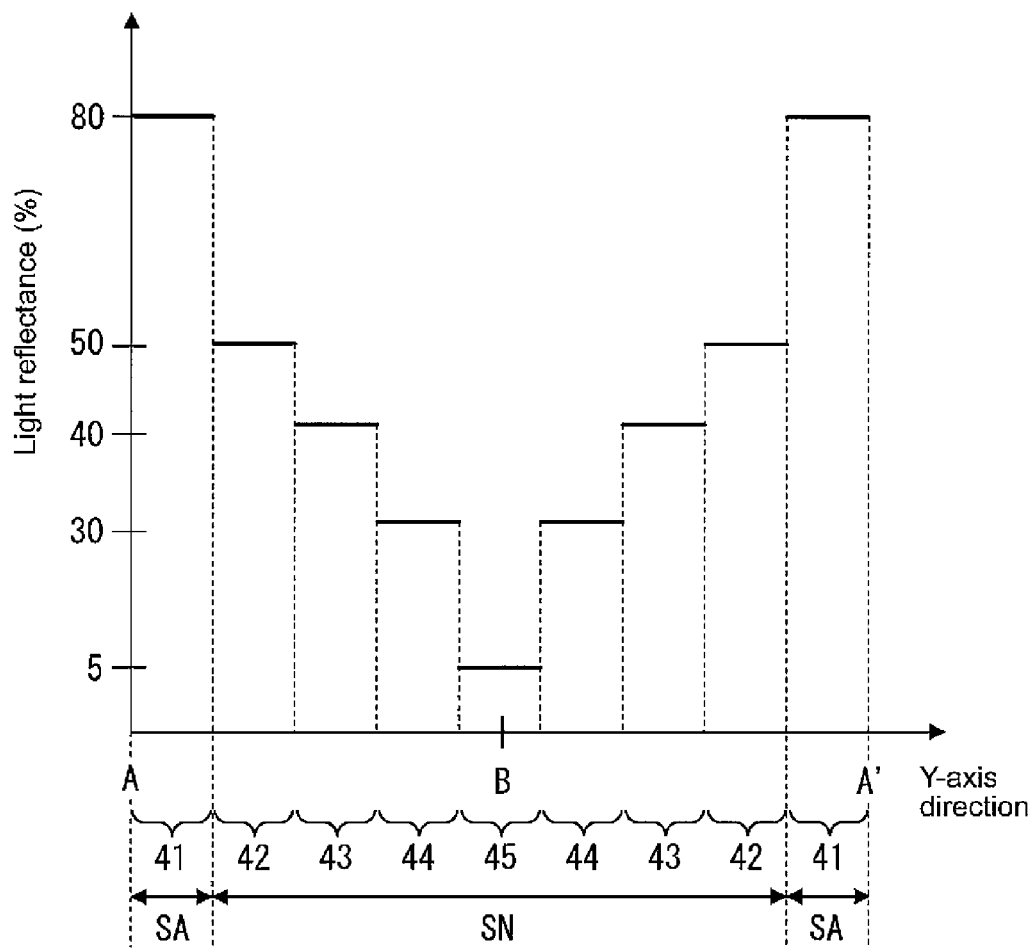
FIG. 7 is a graph illustrating a light reflectance change in the light guide plate of the liquid crystal display device in FIG. 2.

FIG. 1 is an exploded perspective view illustrating a general construction of the television receiver of this embodiment. FIG. 2 is an exploded perspective view illustrating a general construction of the liquid crystal display device included in the television receiver in FIG. 1. FIG. 3 is a cross-sectional view of the liquid crystal display device in FIG. 2. FIG. 4 is a typical view explaining a cross-sectional construction and an operation of the light guide plate of the liquid crystal display device in FIG. 2. FIG. 5 is a typical view illustrating plan arrangement of the light reflecting portions and the light scattering portions formed on the light guide plate. FIG. 6 is an explanation view illustrating an operation of the light guide plate. FIG. 7 is a graph illustrating a light reflectance change in the light guide plate.

As illustrated in FIG. 1, the television receiver TV of the present embodiment includes the liquid crystal display device 10, front and rear cabinets Ca, Cb that house the liquid crystal display device 10 therebetween, a power source P, a tuner T and a stand S. An overall shape of the liquid crystal display device (display device) 10 is a landscape rectangular. The liquid crystal display device 10 is housed in a vertical position such that a short-side direction thereof matches a vertical line. As illustrated in FIG. 2, it includes a liquid crystal panel 11 as a display panel, and a backlight device 12 (lighting device), which is an external light source. They are integrally held by a bezel 13 and the like.

Next, the liquid crystal panel 11 and the backlight device 12 included in the liquid crystal display device 10 will be explained.

The liquid crystal panel (display panel) 11 is constructed such that a pair of glass substrates is bonded together with a predetermined gap therebetween and liquid crystal is sealed between the glass substrates. On one of the glass substrates, switching components (e.g., TFTs) connected to source lines and gate lines that are perpendicular to each other, pixel electrodes connected to the switching components, and an alignment film are provided. On the other substrate, a color filter having color sections such as R (red), G (green) and B (blue) color sections arranged in a predetermined pattern, counter electrodes, and an alignment film are provided. Polarizing plates 11a, 11b are attached to outer surfaces of the substrates.

As illustrated in FIG. 2, the backlight device 12 includes a chassis 14, an optical sheet set 15 provided to cover the opening 14b of the chassis 14 (light guide plate (optical member) 15a and a plurality of optical sheets (light scattering members) 15b that are disposed between the light guide plate 15a and the liquid crystal panel 11), and frames 16. The chassis 14 has a substantially box-shape and an opening 14b on the light output side (on the liquid crystal panel 11 side). The frames 16 arranged along the long sides of the chassis 14 holds the long-side edges of the light guide plate 15a to the chassis 14. The long-side edges of the light guide plate 15a are sandwiched between the chassis 14 and the frames 16. An LED substrate 18 and holders 20 are installed in the chassis 14. A plurality of LED light sources 17 as point light sources are arranged on the LED substrate 18 and the ends of the optical sheet 15 are placed on the holders 20. A light output side of the backlight device 12 is a side closer to the light guide plate 15a than the LED light sources 17.

The chassis 14 is prepared by processing a metal plate. It is formed in a substantially shallow box shape and includes a rectangular bottom plate 14a and outer rims 21, each of which extends upright from the corresponding side of the bottom plate 14a and has a substantially U shape. The outer rims 21 include short-side outer rims 21a and long-side outer rims 21b provided at the short sides and the long sides of the chassis 14, respectively. As illustrated in FIG. 3, fixing holes 14c are provided on the upper surface of the chassis 14 along the long-side outer rims 21b to bind the bezel 13, the frames 16 and the chassis 14 together with screws and the like.

The LED substrate 18 disposed on an inner surface of the bottom plate 14a of the chassis 14 includes a light reflecting sheet 23 and a plurality of LED light sources 17 (point light sources). The light reflecting sheet 23 is disposed on a light output side surface of the LED substrate 18 (on a side that faces the light guide plate 15a). The LED light sources 17 are arranged to be exposed from openings (not shown) formed in the light reflecting sheet 23. Each LED light source 17 is surrounded by opening edge of the opening formed in the light reflecting sheet 23. In the present embodiment, the LED substrate 18 is formed of one plate corresponding to the liquid crystal panel 11. However, the LED substrate 18 may be divided into several pieces and the divided pieces of LED substrate 18 may be arranged on a plane.

The light reflecting sheet 23 provided on the LED substrate 18 is a synthetic resin sheet having a surface in white color that provides high light reflectivity. It is placed so as to cover almost entire surface of the LED substrate 18 except the portions in which the LED light sources 17 are arranged. Each LED light source 17 emits white light. Each LED light source 17 may have three LED chips (not shown) each of which emits light of single color of red, green and blue or may have a blue LED chip and a yellow phosphor. The LED light sources 17 are arranged on a plane surface in a hexagonal close-packed arrangement. Therefore, each interval between the adjacent LED light sources 17, 17 is equal. A connector 22a for connecting a flexible cable 22 extending from a light source driving board 28 is provided on the LED board 18.

The holders 20 provided at the ends of the chassis 14 are made of white synthetic resin so as to direct the light emitted from the LED light sources 17 to the liquid crystal panel 11. Each of them has an elongated substantially box shape that extends along the short side of the chassis 14 as illustrated in FIG. 2. Each holder 20 has steps on the front side such that the light guide plate 15a and the liquid crystal panel 11 are placed thereon. A part of the holder 20 is placed on top of a part of the corresponding short-side outer rim 21a of the chassis 14 and forms a side wall of the backlight device 12 together with the short-side outer rim 21a.

On the outer surface of the bottom plate 14a of the chassis 14 (on a side opposite from the LED light sources 17), the light source driving board 28 is provided at the longitudinal ends. Accordingly, drive power for the LED light sources 17 is supplied from the light source driving board 28 to the LED board 18. On the outer surface of the bottom plate 14a of the chassis 14, a display control board 29 is provided at a middle portion in the longitudinal direction. The display control board 29 controls driving of the liquid crystal panel 11.

On the opening 14b side of the chassis 14, the light guide plate (optical member) 15a and the optical sheet set 15 including the optical sheets (light scattering members) 15b are provided. The light guide plate 15a spreads light emitted from the LED light sources 17 into planer light. The short-side edges of the light guide plate 15a are placed on the holder 20 as described above, and does not receive a vertical force. The long-side edges of the light guide plate 15a are sandwiched between the chassis 14 and the frame 16. Accordingly, the light guide plate 15a covers the opening 14b of the chassis 14.

The optical sheets 15b provided on the light guide plate 15a includes two layered diffuser sheets. The optical sheets 15b convert the light that is emitted from the LED light sources 17 and passes through the light guide plate 15a to planar light. The liquid crystal display panel 11 is disposed on the top surface of the top layer of the optical sheets 15b. The optical sheets 15b are held between the light guide plate 15a and the liquid crystal panel 11.

The construction of the light guide plate 15a will be explained with reference to FIGS. 4 to 7.

In FIG. 4, the arrows represent the directions of emission or reflection of light emitted from the LED light sources 17. In FIGS. 5 and 6, the long-side direction of the light guide plate is referred to as an X-axis direction and the short-side direction thereof is referred to as a Y-axis direction. In FIG. 7, a horizontal axis shows the Y-axis direction (short-side direction) and the light reflectance is plotted on a graph from the point A to the point B of the Y-axis direction and from the point B to the point A' of the Y-axis direction.

The light guide plate 15a is formed of organic high molecule preferably selected from polymethylmethacrylate, methacylate styrene and polycarbonate. The light guide plate 15a is a plate member having a substantially uniform light transmittance over an entire area (an entire area is substantially transparent). The light guide plate 15a has a surface facing the LED light sources 17 (first surface 30a) and a surface facing the optical sheets 15b (second surface 30b) that is positioned opposite from the first surface 30a. As illustrated in FIG. 5, light reflecting portions 31 and light scattering portions 32 that have a dot pattern are formed on the second surface 30b of the light guide plate 15a. The dot pattern forming the light reflecting portions 31 and the light scattering portions 32 is formed by printing paste containing inorganic beads, for example, on the second surface 30b of the light guide plate 15a. Preferable printing means is serigraph, inkjet printing, screen printing and the like.

The light reflecting portion 31 has a light reflectance of 80% and the light guide plate 15a has a light reflectance of 5%. Thus, the light reflecting portion 31 has a high light reflectance. In the present embodiment, the light reflectance of each material is represented by an average light reflectance measured with a LAV of CM-3700d (measurement area diameter of 25.4 mm) manufactured by Konica Minolta inside the measurement circle. The light reflectance of the light reflecting portion 31 is measured in the following method. The light reflecting portion 31 is formed over an entire surface of a glass substrate and the light reflectance of the surface is measured according to the above measurement means. The light reflectance of the light reflecting portion 31 is preferably 80% or more, and more preferably 90% or more. Thus, as the light reflectance of the light reflecting portion 31 is higher, the light reflection is controlled more precisely and accurately according to a pattern form of the dot pattern such as the number of dots or the area of each dot.

Each of the light reflecting portions 31 is formed by arranging a plurality of circular or square dots (circular dots in FIG. 5) in a predetermined pattern. Inorganic beads each having a diameter of approximately several hundreds µm are dispersed in each dot and each dot has a surface in white color that provides high light reflectance. In each portion of the second surface 30b of the light guide plate 15a that overlaps the LED light source 17 (light source overlapped portion SA), the light reflecting portion 31 is formed over an entire area of each portion that is overlapped with the LED light source 17. Namely, the light reflecting portion 31 is formed by forming each dot all over the entire area of the light source overlapped portion SA. Further, the light reflecting portions 31 are also formed in portions of the second surface 30b that do not overlap the LED light source 17 (empty portion overlapping surface SN). The area of each dot continuously reduces in a direction away from the light source overlapped portion SA. In a portion of the second surface 30b furthest from the light source overlapped portion SA, that is, a portion of the second surface 30a that overlaps a center between the adjacent LED light sources 17 (represented by B in FIG. 6), an area where a dot area of the light reflecting portion 31 is smallest is ensured. In FIG. 6, a position in the light reflecting portion 31 that overlaps the LED light source 17 is represented by A, A'.

Thus, the light reflectance of the second surface 30b of the light guide plate 15a is changed by changing the area occupied by the dots (dot pattern) of the light reflecting portions 31. The light reflectance of the light reflecting portion 31 is higher than that of the second surface 30b of the light guide plate 15a. Therefore, the light reflectance becomes relatively higher by relatively increasing the area occupied by the dots of the light reflecting portions 31, and the light reflectance becomes relatively lower by decreasing the area occupied by the dots of the light reflecting portions 31. As a method of adjusting the light reflectance, the area of each dot of the light reflecting portion 31 may be same and a distance between the adjacent dots may be changed.

In the present embodiment, the light reflectance of the second surface 30b of the light guide plate 15a changes according to distances from the adjacent LED light sources 17, 17 as illustrated in FIG. 7. Specifically, in the portion of the second surface 30b that overlaps the LED light source 17, that is, in the light source overlapped portion SA, the light reflectance is uniform to be 80% and represents a maximum value on the light guide plate 15a. On the other hand, in the portion of the second surface 30b that does not overlap the cold cathode tube 17, that is, in the empty portion overlapping surface SN, the light reflectance decreases in a gradual manner from the portion closer to the light source overlapped portion SA toward the portion away from the light source overlapped portion SA. The light reflectance is set to a lowest value that is 5% at a middle portion (represented by B in FIG. 7) of the empty portion overlapping surface SN.

Specifically, a first area 41 having relatively high light reflectance is provided in the light source overlapped portion SA on the second surface 30b of the light guide plate 15a, and second areas 42, 42 having light reflectance relatively lower than the first area 41 are provided next to the first area 41 in the empty portion overlapping surface SN. Further, in the empty portion overlapping surface SN, third areas 43, 43 having light reflectance relatively lower than the second areas 42 are provided at the sides of the second areas 42, fourth areas 44, 44 having light reflectance lower than the third areas 43 are provided at the sides of the third areas 43, and fifth areas 45, 45 having light reflectance lower than the fourth areas 44 are provided at the sides of the fourth areas 44. In this embodiment, the light reflectance of the second surface 30b of the light guide plate 15a is 80% in the first area 41, 50% in the second area 42, 40% in the third area 43, 30% in the fourth area 44, and 5% in the fifth area 45. A plurality of areas 42, 43, 44, 45 having different light reflectance are defined in the empty portion overlapping surface SN of the second surface 30b of the light guide plate 15a. The light reflectance is lowered from the second area 42 to the fifth area 45 sequentially in this order such that the light reflectance decreases in a stepwise manner from the portion closer to the light source overlapped portion SA toward the portion farther therefrom.

Each of the light scattering portions 32 is formed by arranging a plurality of circular or square dots (circular dots in FIG. 5) in a predetermined pattern. Inorganic beads each having a diameter of approximately from several nm to several hundreds nm are dispersed in each dot and each dot has good light scattering property and is visible as a dark point. The light scattering portions 32 are formed on the empty portion overlapped surface SN of the second surface 30b of the light guide plate 15a. More specifically, the area of each dot of the light scattering portions 32 decreases in a stepwise manner from the middle portion of each empty portion overlapping surface SN (the portion farthest from the adjacent three LED light sources 17, 17, 17) toward the light source overlapped portions SA each of which includes each of the three adjacent LED light sources 17, 17, 17. In other words, in the empty portion overlapping surface SN, the area of each dot of the light scattering portions 32 increases in a stepwise manner from the portions closer to the light source overlapped portions SA toward the portion away from the light source overlapped portions SA.

Next, an operation of the light reflecting portions 31 and the light scattering portions 32 formed on the light guide plate 15a will be explained.

As illustrated in FIG. 4, the light emitted from the LED light source 17 (illustrated by a solid line in FIG. 4) passes through the light guide plate 15a from the first surface 30a to the second surface 30b. Most of the emitted light reflects off the light reflecting portion 31 (first light reflecting portion) formed in the light source overlapped portion SA of the second surface 30b of the light guide plate 15a to the first surface 30a, and the light that does not reflect off the light reflecting potion 31 is output to the optical sheets 15b. Among the light reflecting off the light reflecting portion 31, the light having an entry angle with respect to the first surface 30a greater than a critical angle (illustrated by a dotted line in FIG. 4) completely reflects off the first surface 30a (forming a second light emitting portion) and enters the light guide plate 15a again. On the other hand, the light having an entry angle with respect to the first surface 30a smaller than the critical angle (illustrated by a dashed line in FIG. 4) passes through the first surface 30a toward the LED substrate 18.

The light reflecting off the first surface 30a of the light guide plate 15a may reach the empty portion overlapping surface SN of the second surface 30b. On the other hand, the light passing through the light guide plate 15a to the LED substrate 18 side reflects off the reflecting sheet 23 provided on the LED substrate 18 (forming a second light reflecting portion) and enters the light guide plate 15a again and may reach the empty portion overlapping surface SN. The light reaching the empty portion overlapping surface SN of the light guide plate 15a is scattered by the light scattering portions 32 formed on the second surface 30b corresponding to the empty portion overlapping surface SN. Accordingly, the light is output from a wide area in the empty portion overlapping surface SN of the second surface 30b.

As described above, according to the present embodiment, the light guide plate 15a formed of a member having a substantially uniform light transmittance is provided to face the LED light sources 17 (LED substrate 18). The light guide plate 15a has the first surface 30a facing the LED light sources 17 and the second surface 30b opposite from the first surface 30a. On the second surface 30b, the light reflecting portions 31 are formed in the portions that overlap the LED light sources 17 (light source overlapped portions SA), and the light scattering portions 32 are formed in the portions that do not overlap the LED light sources 17 (empty portion overlapping surfaces SN). According to such a configuration, the light emitted from the LED light source 17 reflects off the light reflecting portions 31 and is scattered by the light scattering portions 32, and therefore the light is effectively used and the illumination light emitted from the light guide plate 15a has uniform brightness.

The light reflecting portions 31 are formed in the portions of the light guide plate 15a that overlap the LED light sources 17 (light source overlapped portion SA). The light emitted from the LED light sources 17 easily reaches the light source overlapped portion SA. Most of the light emitted from the LED light sources 17 reflects off the light reflecting portions 31 (does not pass through the light source overlapped portions SA), and the brightness of illumination light (light emitted from the optical member and irradiated to an object to be illuminated) is suppressed with respect to the light emission amount from the LED light sources 17. Further, the light emitted from the LED light sources 17 reflects off the first surface 30a or the light reflecting sheet 23 to be directed to the empty portion overlapping surface SN. The light that reaches the portion of the light guide plate 15a that is not overlapped with the LED light source 17 (empty portion overlapping surface SN) is output from the empty portion overlapping surface SN.

The light emitted from the LED light source 17 is reflected by the light reflecting portions 31 to be directed to the empty portion overlapping surface SN of the light guide plate 15a. This compensates for the brightness of the empty portion overlapping surface SN. Especially, the light guide plate 15a on which the light reflecting portions 31 are formed is made of a member having a substantially uniform light transmission. Therefore, the light amount passing through the light guide plate 15a is controlled by changing the arrangement pattern of the light reflecting portions 13. Accordingly, uniform light brightness can be easily obtained.

The brightness of the portions where no LED light source 17 is arranged is compensated. Therefore, even if the distance between the LED light sources 17 is relatively increased by reducing the number of LED light sources 17 for example, uniformity of brightness can be ensured. This contributes to cost reduction and power saving.

The light guide plate 15a is arranged to face the LED light sources 17 such that any other members are not arranged between the light guide plate 15a and the LED light sources 17. Accordingly, it is prevented that light emitted from the LED light sources 17 is refracted by other member and output without being reflected by the light reflecting portions 31. The effects of the light reflecting portions 31 can be surely obtained.

According to the present embodiment, the light reflecting portions 31 are also formed in the empty portion overlapping surface SN of the light guide plate 15a and the light reflectance of the light source overlapped portion SA is higher than that of the empty portion overlapping surface SN.

According to such a configuration, a greater amount of light passes through the empty portion overlapping surface SN than the light source overlapped portion SA. Therefore, the empty portion overlapping surface SN is not darkened and obtains a predetermined illumination brightness.

In the present embodiment, the light reflectance of the second surface 30b of the light guide plate 15a is lowered in a direction away from the light source overlapped portion SA.

According to such a configuration, the light reflecting off the light reflecting portion 31 of the light source overlapped portion SA relatively easily reflects off the reflecting portions 31 at the portions of the empty portion overlapping surface SN closer to the light source overlapped portion SA and thus reflecting light reaches the portions of the empty portion overlapping surface SN away from the light source overlapped portion SA. At the portions of the empty portion overlapping surface SN away from the light source overlapped portion SA, the light reflectance is relatively low, and therefore a greater amount of light passes therethrough and a predetermined brightness can be obtained. Therefore, substantially uniform illumination light can be output from the empty portion overlapping surface SN of the light guide plate 15a. Accordingly, a moderate distribution of illumination brightness can be achieved in the backlight device 12.

In the present embodiment, the light reflecting portions 31 are formed in a dot pattern having excellent light reflectivity. In the present embodiment, the light scattering portions 32 are formed in a dot pattern having an excellent light scattering property. Thus, since the light reflecting portions 31 and the light scattering portions 32 are formed in a dot pattern, the light reflection and the light scattering intension are controlled by a pattern form (an area of each dot in the present embodiment). Accordingly, uniform illumination brightness can be easily obtained.

In the present embodiment, the dot pattern of the light reflecting portions 31 is formed such that an area of each dot decreases in a gradual manner toward the portion of the empty portion overlapping surface SN away from the light source overlapped portion SA.

According to such a configuration, the light reflecting portion 31 has light reflectance greater than the light guide plate 15a. Therefore, the light reflectance decreases toward the portion of the empty portion overlapping surface SN away from the light source overlapped portion SA of the light guide plate 15a. A relatively greater amount of light reflects off the portions of the light guide plate 15a that light emitted from the LED light sources 17 easily reaches, and a relatively smaller amount of light reflects off the portions of the light guide plate 15a that light emitted from the LED light sources 17 less likely reaches. Accordingly, light passes substantially equally through the entire light guide plate 15a, and uniform illumination brightness can be obtained in the backlight device 12.

In the present embodiment, the dot pattern of the light scattering portions 32 is formed such that an area of each dot increases toward the portion of the empty portion overlapping surface SN away from the light source overlapped portion SA of the light guide plate 15a.

According to such a configuration, since the light scattering portions 32 are more excellent in the light scattering property than the light guide plate 15a, incoming light is easier to be scattered toward the portion of the empty portion overlapping surface SN away from the light source overlapped portion SA of the light guide plate 15a. Therefore, light is relatively less likely to be scattered at the portions of the empty portion overlapping surface SN that light emitted from the cold cathode tubes 17 easily reaches, and light is relatively easily scattered at the portions of the empty portion overlapping surface SN that light emitted from the cold cathode tubes 17 less likely reaches. Accordingly, the light is scattered in a larger area in the portions that the emission light less likely reaches. Therefore, the light passes substantially equally through the entire light guide plate 15a and uniform illumination brightness can be obtained in the backlight device 12.

In the present embodiment, the light scattering portions 32 are formed on the second surface 30b of the light guide plate 15a. According to such a configuration, after the light enters the light guide plate 15a and reflects off the light reflecting portions 31, the light reflects off the first surface 30a again and the light is surely scattered on the second surface 30b by the light scattering portions 32 and output from the light guide plate 15a. This effectively achieves the scattering effect of the light scattering portions 32.

In the present embodiment, the optical sheets (light scattering member) 15b that scatter the light passing through the light guide plate 15a are provided on the light output side of the light guide plate 15a. According to such a configuration, it is suppressed that the dot pattern of the light reflecting portions 31 and the light scattering portions 32 is visible as a pattern image. This ensures uniformity of illumination light.

The first embodiment of the present invention is described. The present invention is not limited to the first embodiment, and may include following modifications for example. In the following modifications, the same parts as the above embodiment are indicated by the same symbols and will not be illustrated and explained.

First Modification of First Embodiment

Figure 8:
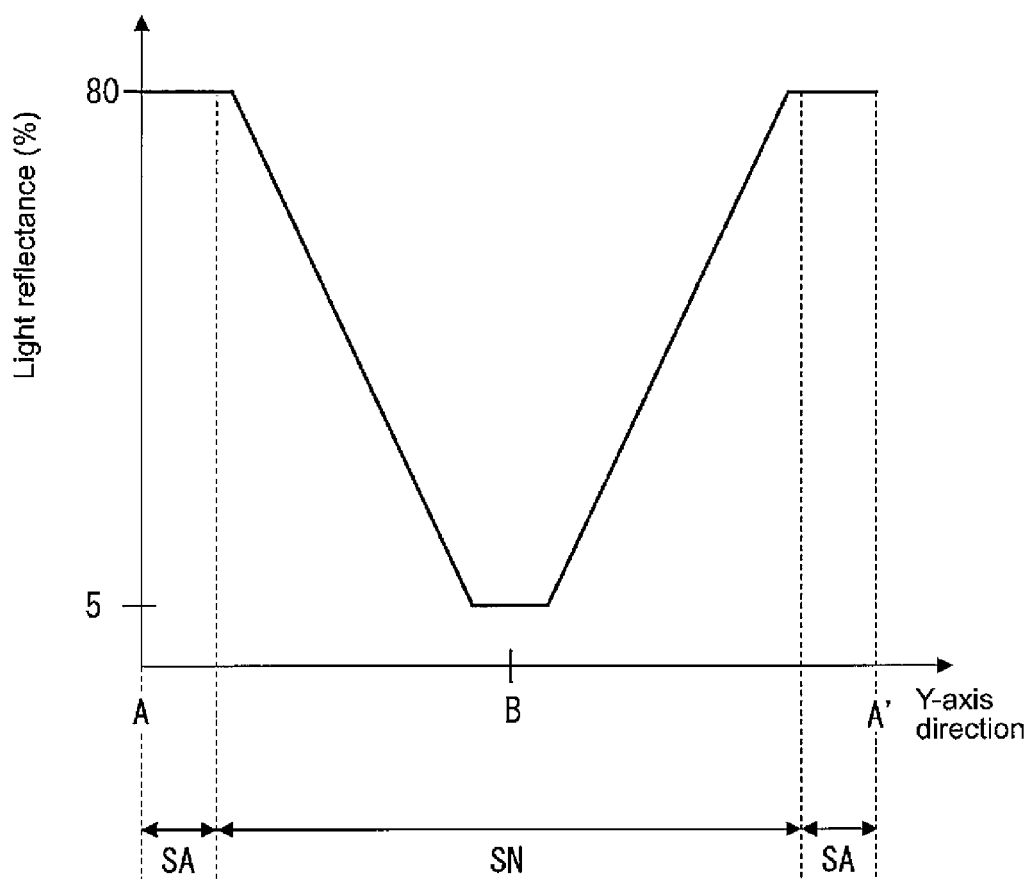
FIG. 8 is a graph illustrating a light reflectance change in the light guide plate according to a first modification of the first embodiment.

As one modification of the arrangement of the light reflecting portions 31 on the second surface 30b of the light guide plate 15a of the first embodiment, the light reflecting portions 31 may be arranged to have a light reflectance distribution illustrated in FIG. 8.

In the light reflectance distribution illustrated in FIG. 8, the light reflectance of the empty area overlapping surface SN changes in a continuous and gradual manner. Such a light reflectance distribution is achieved by reducing a density of the reflection dot pattern of the light reflecting portions 31 in a continuous and gradual manner from a point A in the light source overlapped portion SA to a point B in the empty portion overlapped surface SN.

Second Modification of First Embodiment

Figure 9:
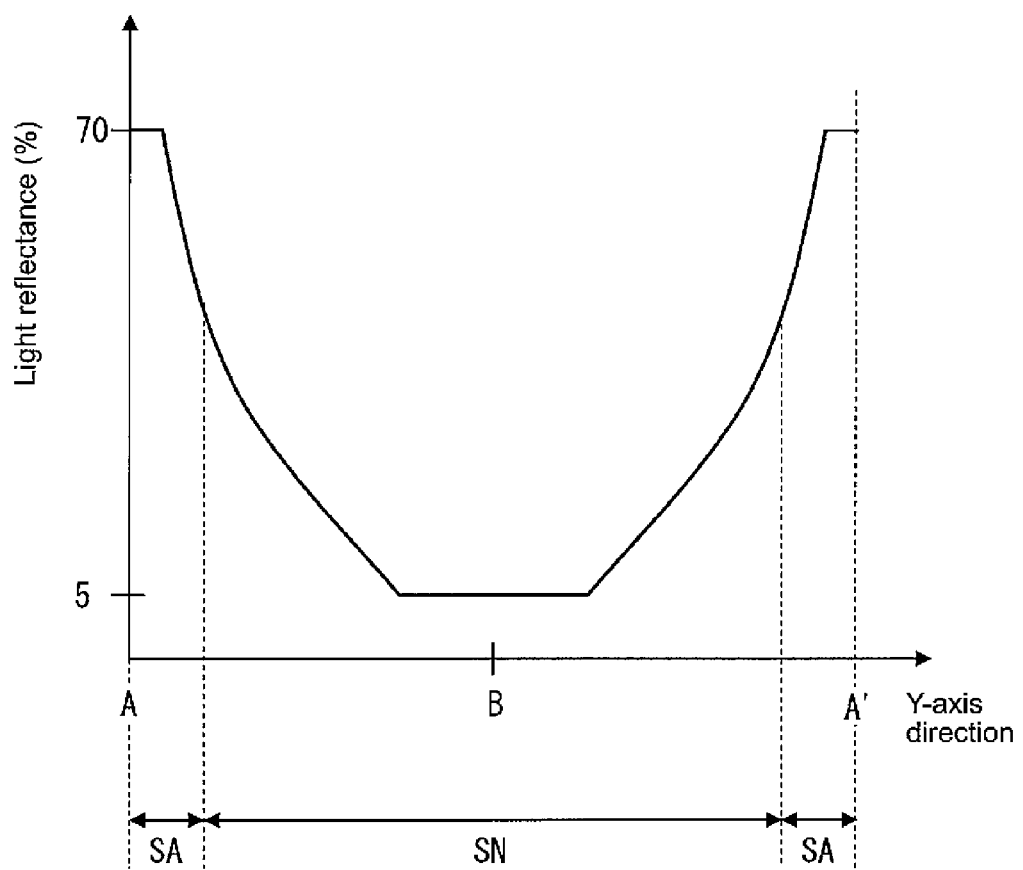
FIG. 9 is a graph illustrating a light reflectance change in the light guide plate according to a second modification of the first embodiment.

As another modification of the arrangement of the light reflecting portions 31 on the second surface 30b of the light guide plate 15a of the first embodiment, the light reflecting portions 31 may be arranged to have a light reflectance distribution illustrated in FIG. 9. In the light reflectance distribution illustrated in FIG. 9, in the empty portion overlapping surface SN, the light reflectance changes in a continuous and gradual manner and an area having no dot pattern is formed in adjacent to the point B in the empty portion overlapped surface SN. Such a light reflectance distribution is achieved by reducing the density of the reflection dot pattern of the light reflecting portions 31 in a continuous and gradual manner from the point A in the light source overlapped portion SA to the point B in the empty portion overlapped surface SN and forming an area having no dot pattern. The area ranges a predetermined distance away from the point B.

Third Modification of First Embodiment

Figure 10:
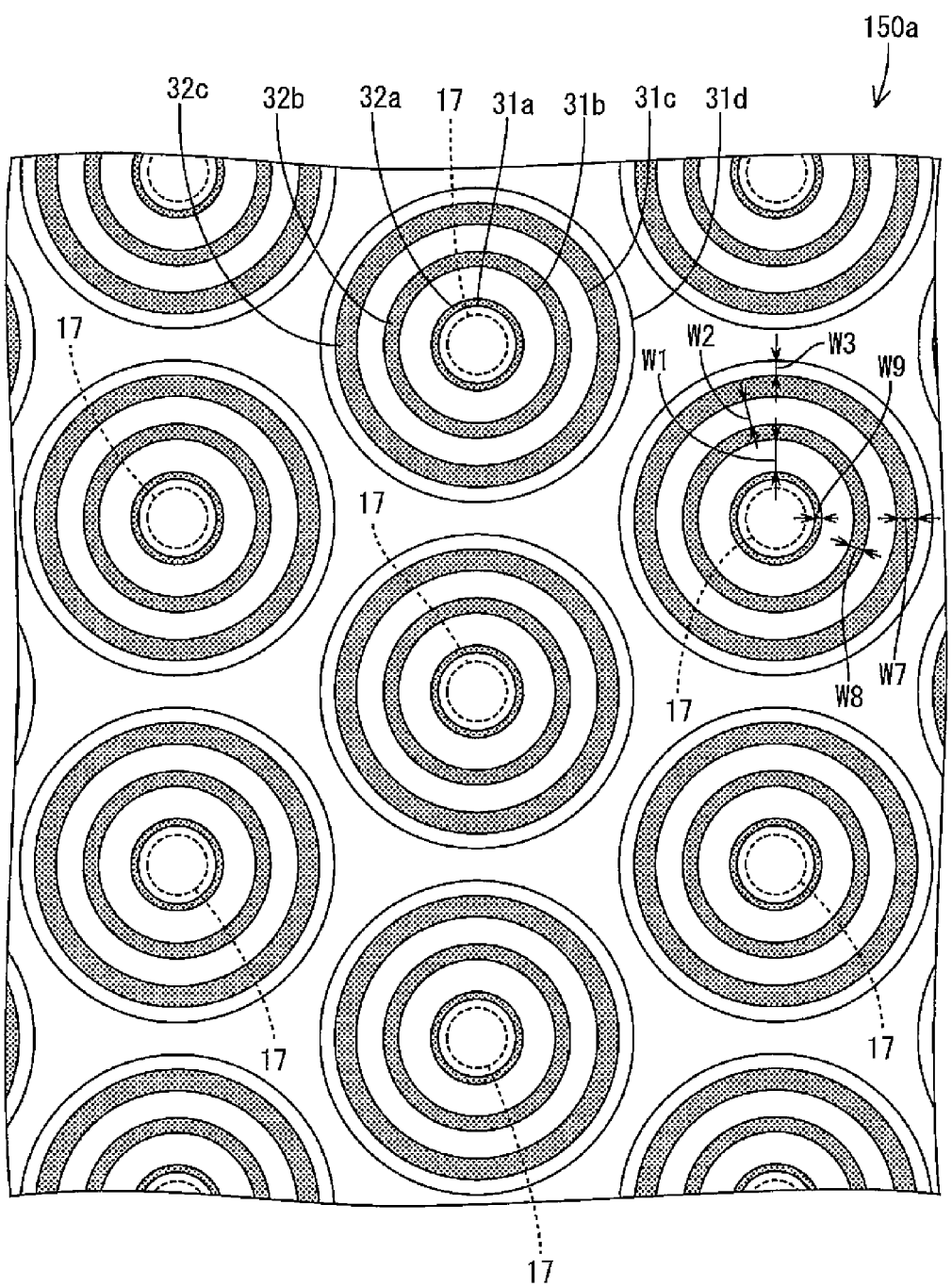
FIG. 10 is a typical view illustrating plan arrangement of the light reflecting portions and light scattering portions formed on the light guide plate according to a third modification of the first embodiment.

As an additional modification of the arrangement of the light reflecting portions 31 on the second surface 30b of the light guide plate 15a of the first embodiment, the light reflecting portions 31 may be arranged as illustrated in FIG. 10.

FIG. 10 typically illustrates a pattern example of the light reflecting portions 31 formed on the light guide plate 150a. The light reflecting portion 31 formed on the light guide plate 150a includes a light source overlapped light reflecting portion 31a, a first ring-shaped light reflecting portion 31b, a second ring-shaped light reflecting portion 31c and a third ring-shaped light reflecting portion 31d. The light source overlapped light reflecting portion 31a is provided to overlap the LED light source 17. The first ring-shaped light reflecting portion 31b is formed a predetermined distance away from the light source overlapped light reflecting portion 31a. The second ring-shaped light reflecting portion 31c is formed a predetermined distance away from the first ring-shaped light reflecting portion 31b. The third ring-shaped light reflecting portion 31d is formed a predetermined distance away from the second ring-shaped light reflecting portion 31c. The light scattering portion 32a is formed between the light reflecting portions 31a and 31b. The light scattering portion 32b is formed between the light reflecting portions 31b and 31c, and the light scattering portion 32c is formed between the light reflecting portions 31c and 31d.

Ring widths W1, W2, W3 of the light reflecting portions 31b, 31c, 31d decrease as a distance from the LED light source 17 increases. Ring widths W9, W8, W7 of the light scattering portions 32a, 32b, 32c increase as a distance from the LED light source 17 increases. Accordingly, as the light reflecting portion or the light scattering portion is away from the LED light source 17, the light reflectance reduces and the light scattering intension increases.

Fourth Modification of First Embodiment

Figure 11:
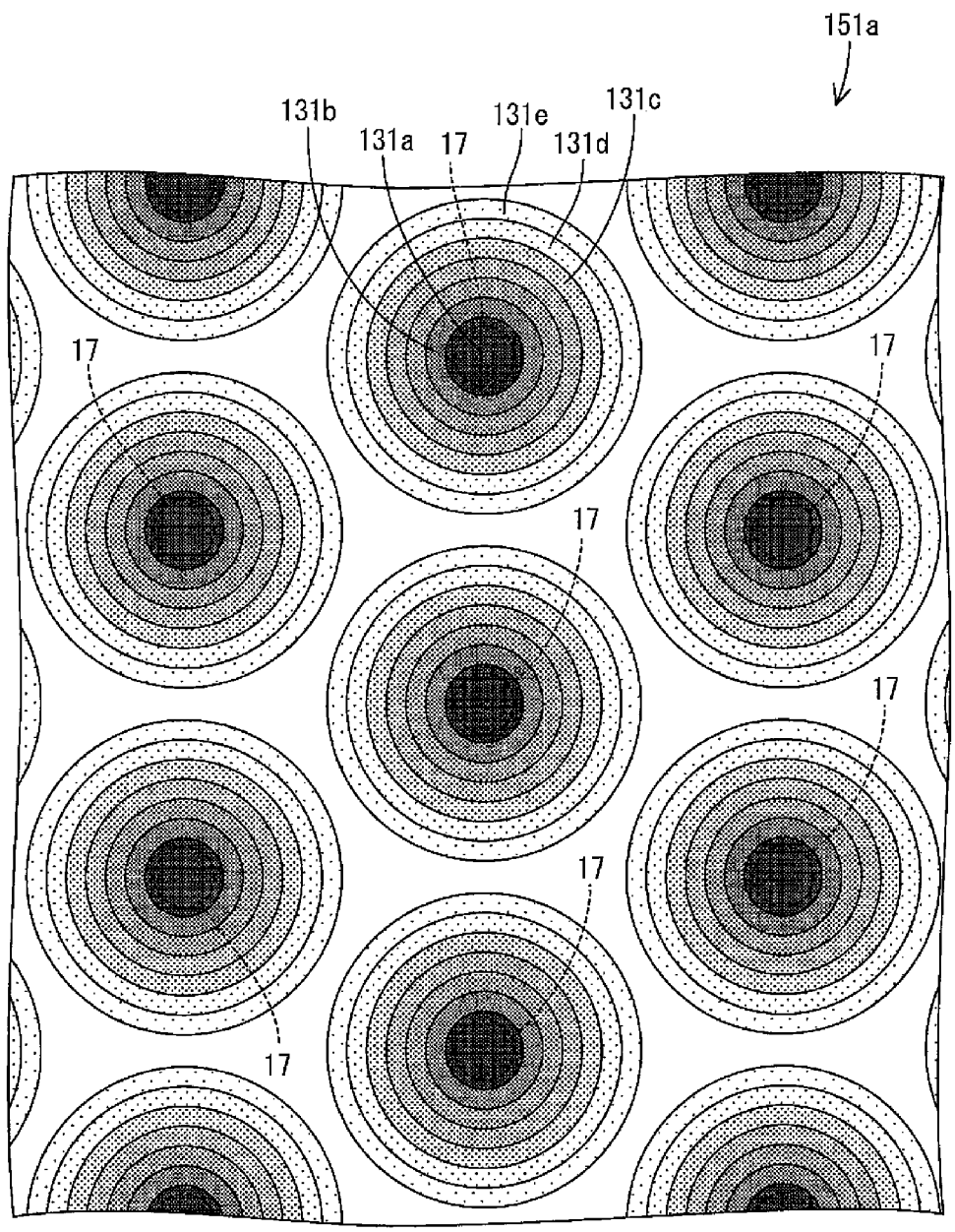
FIG. 11 is a typical view illustrating plan arrangement of the light reflecting portions formed on the light guide plate according to a fourth modification of the first embodiment.

As an additional modification of the arrangement of the light reflecting portions 31 on the second surface 30b of the light guide plate 15a of the first embodiment, the light reflecting portions 31 may be arranged as illustrated in FIG. 11.

FIG. 11 typically illustrates a pattern example of the light reflecting portions 31 formed on the light guide plate 151a. The light reflecting portion 31 formed on the light guide plate 151a includes a light source overlapped light reflecting portion 131a, a first ring-shaped light reflecting portion 131b, a second ring-shaped light reflecting portion 131c, a third ring-shaped light reflecting portion 131d and a fourth ring-shaped light reflecting portion 131e. The light source overlapped light reflecting portion 31a is provided to overlap the LED light source 17. The first ring-shaped light reflecting portion 131b is formed in adjacent to the light source overlapped light reflecting portion 131a. The second ring-shaped light reflecting portion 131c is formed in adjacent to the first ring-shaped light reflecting portion 131b. The third ring-shaped light reflecting portion 131d is formed in adjacent to the second ring-shaped light reflecting portion 131c. The third ring-shaped light reflecting portion 131d is formed in adjacent to the second ring-shaped light reflecting portion 131c. The fourth ring-shaped light reflecting portion 131e is formed in adjacent to the third ring-shaped light reflecting portion 131d. The light reflectance per a unit area decreases in the light reflecting portions 131a to 131e as it is away from the LED light source 17. In other words, the light reflecting portion is configured such that the light reflectance decreases from the light source overlapped light reflecting portion 131a to the fourth ring-shaped light reflecting portion 131e.

Each of the light reflecting portions 131a to 131e contains light scattering particles for scattering the light. The light scattering intension of the light reflecting portions 131a to 131e increases as it is away from the LED light source 17.

Fifth Modification of First Embodiment

Figure 12:
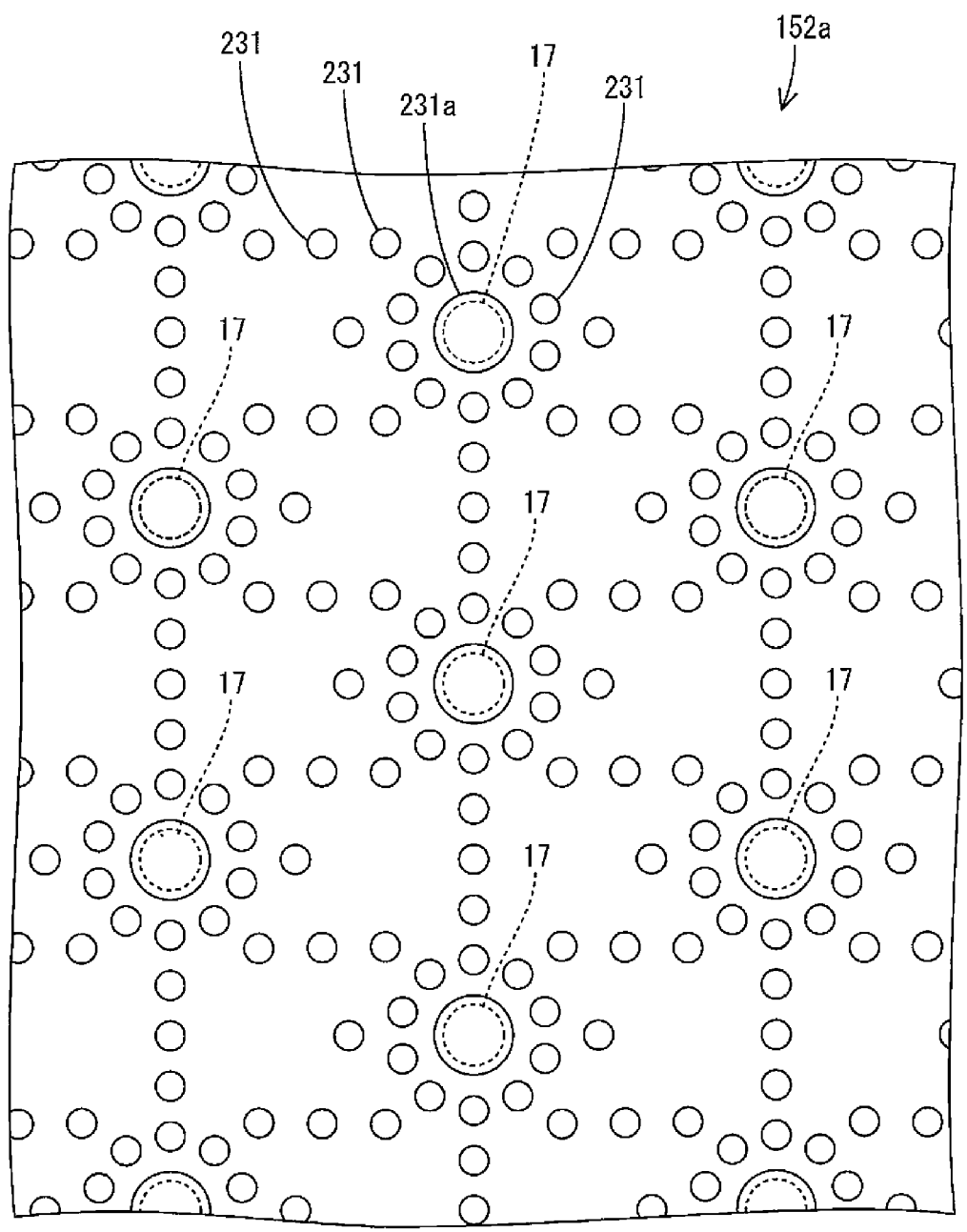
FIG. 12 is a typical view illustrating plan arrangement of the light reflecting portions formed on the light guide plate according to a fifth modification of the first embodiment.

As an additional modification of the arrangement of the light reflecting portions 31 on the second surface 30b of the light guide plate 15a of the first embodiment, the light reflecting portions 31 may be arranged as illustrated in FIG. 12.

FIG. 12 typically illustrates a pattern example of the light reflecting portions 31 formed on the light guide plate 152a. The light reflecting portion 31 formed on the light guide plate 152a includes a light source overlapped light reflecting portion 231a and a plurality of dot patterns including dots 231. The dot patterns include a first dot pattern, a second dot pattern and a third dot pattern. The first dot pattern includes a plurality of dots 231 around the light source overlapped light reflecting portion 231a with a predetermined distance therefrom (on a first imaginary circle that is provided a predetermined distance away from the light source overlapped light reflecting portion 231a). The second dot pattern includes a plurality of dots 231 around the first dot pattern with a predetermined distance therefrom (on a second imaginary circle that is provided a predetermined distance away from the first imaginary circle). The third dot pattern includes a plurality of dots 231 around the second dot pattern with a predetermined distance therefrom (on a third imaginary circle that is provided a predetermined distance away from the second imaginary circle).

The number of dots 231 included in each dot pattern formed on each imaginary circle decreases as it is away from the LED light source 17. The number of dots included in the dot pattern 231 decreases as it is away from the LED light source 17 so that the light reflectance decreases as it is away from the LED light source 17. On each of the imaginary circles, a dot pattern having light scattering property (not shown) is formed. The number of dots included in the light scattering dot pattern increases as it is away from the LED light source 17. Accordingly, the light scattering intensity increases as it is away from the LED light source 17.

Sixth Modification of First Embodiment

Figure 13:
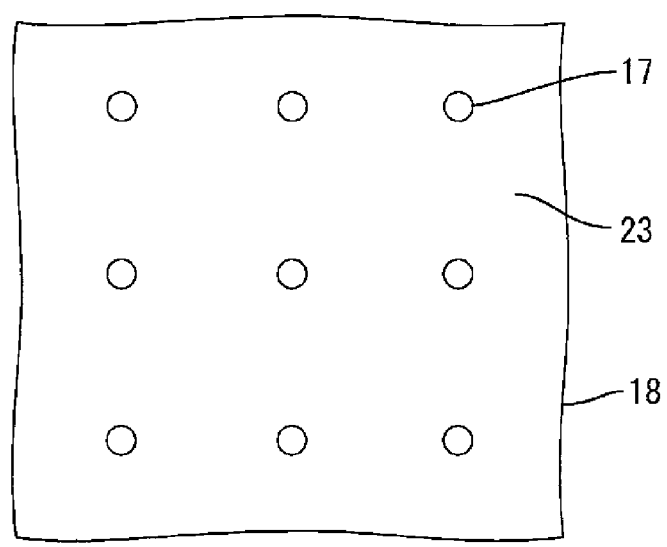
FIG. 13 is a typical view illustrating plan arrangement of the LED light sources according to a sixth modification of the first embodiment.
Figure 14:
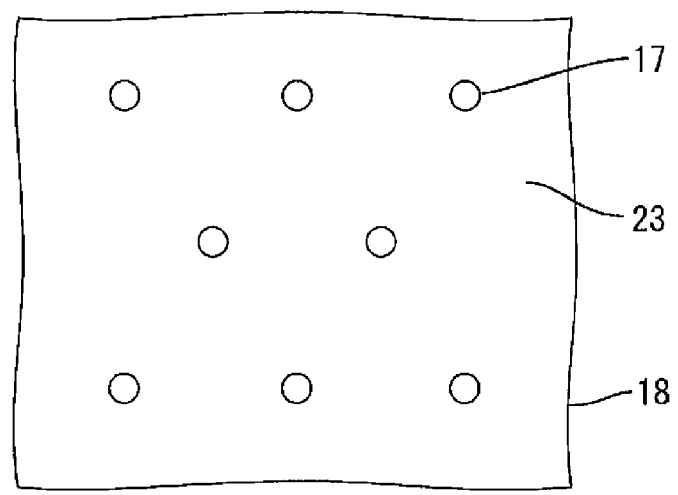
FIG. 14 is a typical view illustrating a modification of the plan arrangement of the LED light sources according to the sixth modification of the first embodiment.

The LED light sources 17 may be arranged on the LED substrate 18 as illustrated in FIGS. 13 and 14 as a modification of the first embodiment. In the first embodiment, the LED light sources 17 are arranged in a hexagonal close-packed arrangement so that the adjacent LED light sources 17 are arranged at equal intervals. However, as illustrated in FIG. 13, the LED light sources 17 may be aligned vertically and horizontally to be arranged in a grid. Also, as illustrated in FIG. 14, the LED light sources 17 may be aligned vertically and horizontally to be arranged in a staggered arrangement such that the adjacent LED light sources 17 are offset from each other.

Second Embodiment

A second embodiment of the present invention will be explained with reference to FIGS. 15 to 18. The second embodiment differs from the first embodiment in that an arrangement configuration of the LED light sources 17 (LED substrate 18) is changed, and other components and configurations are same as the above embodiment. The same parts as the above embodiment are indicated by the same symbols and will not be explained.

Figure 15:
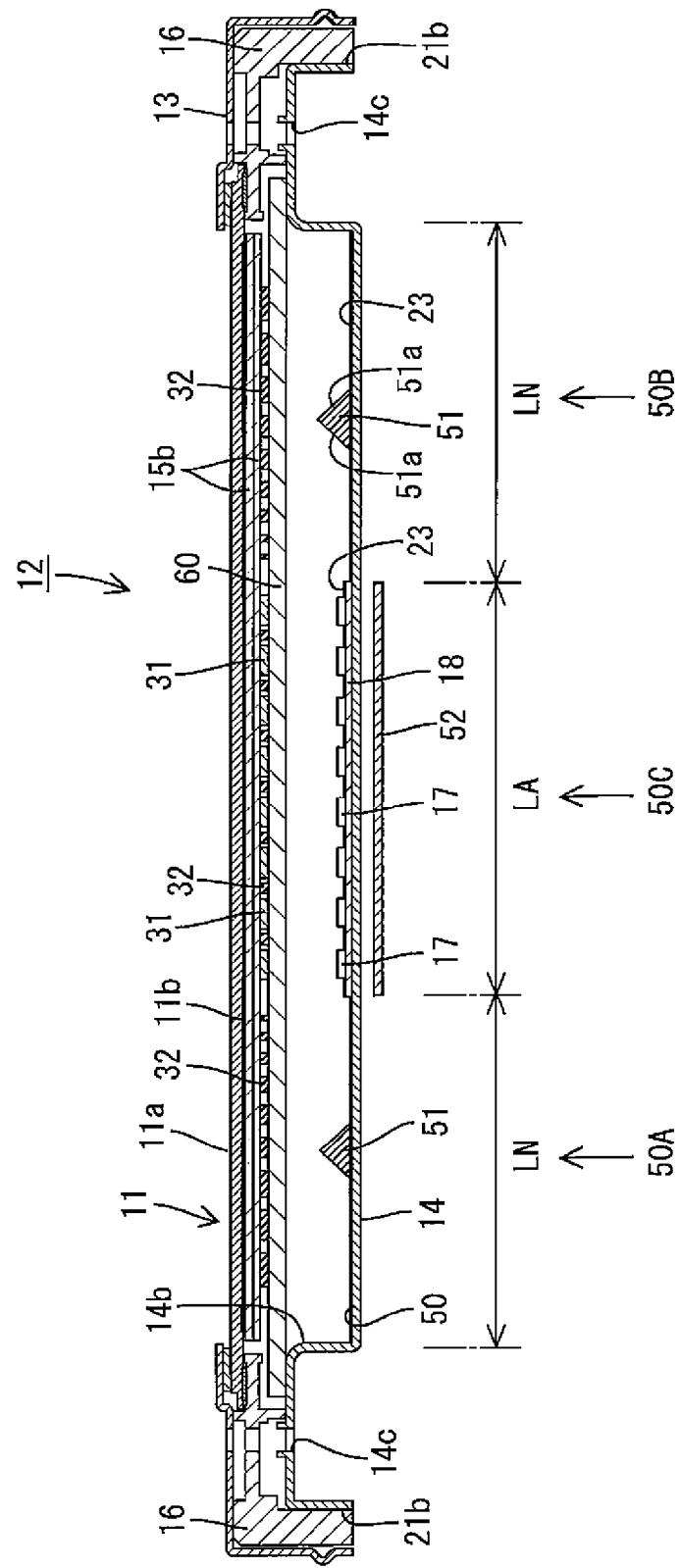
FIG. 15 is a cross-sectional view of the liquid crystal display device according to a second embodiment of the present invention along the short-side direction.
Figure 16:
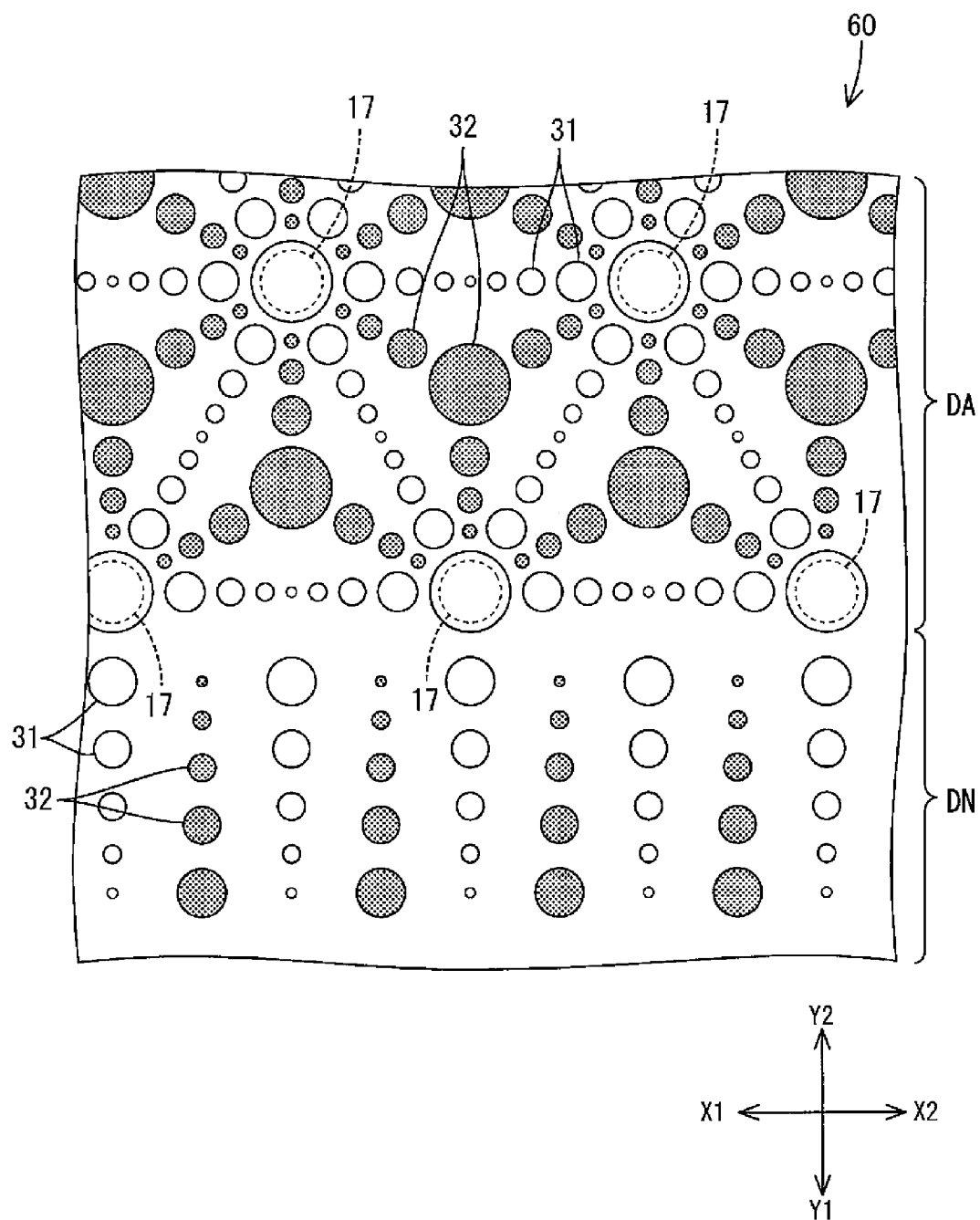
FIG. 16 is a typical view illustrating plan arrangement of the light reflecting portions and the light scattering portions formed on the light guide plate of the liquid crystal display device in FIG. 15.
Figure 17:
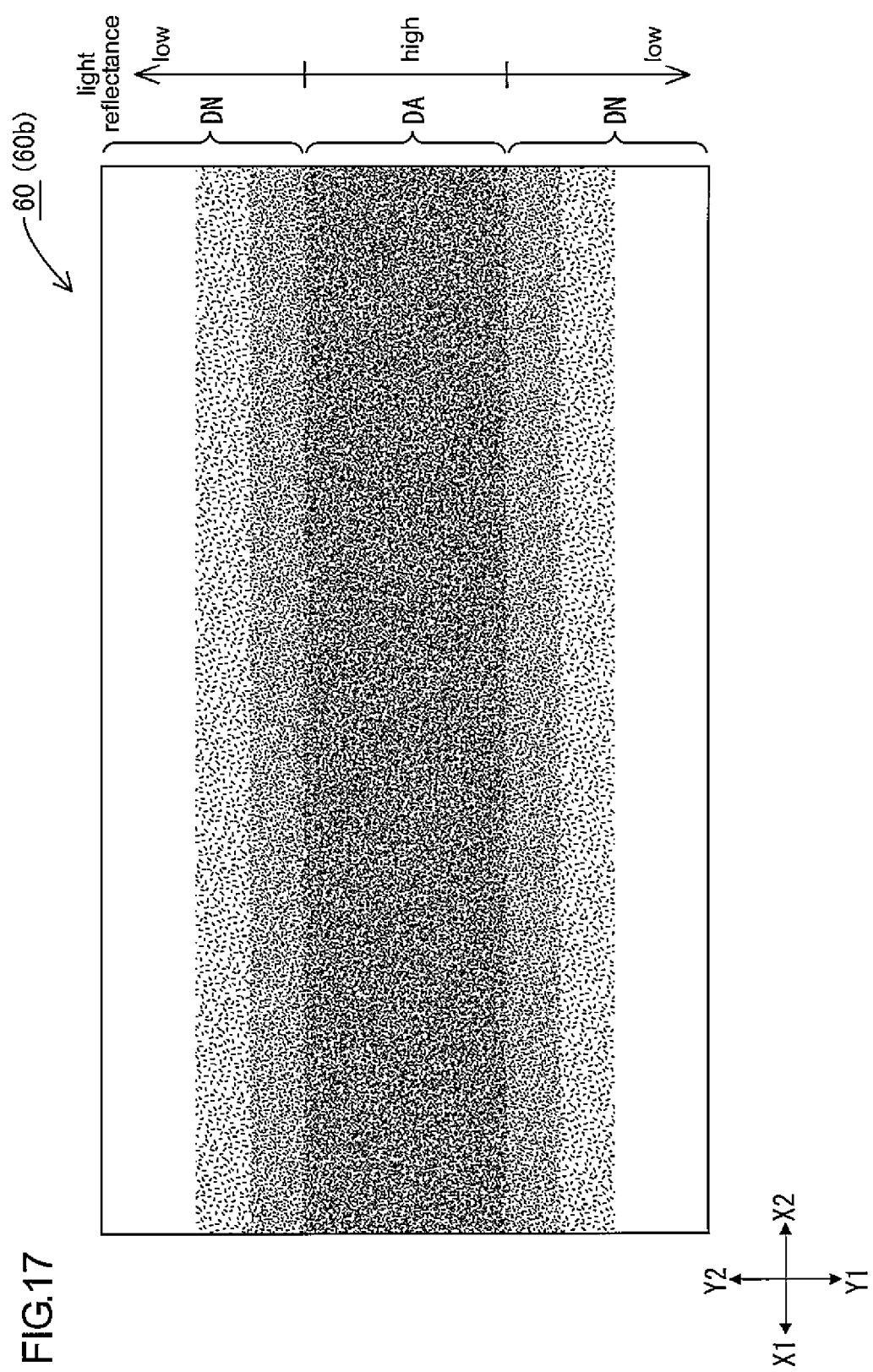
FIG. 17 is a plan view explaining a light reflectance distribution on the second surface of the light guide plate of the liquid crystal display device in FIG. 15.
Figure 18:
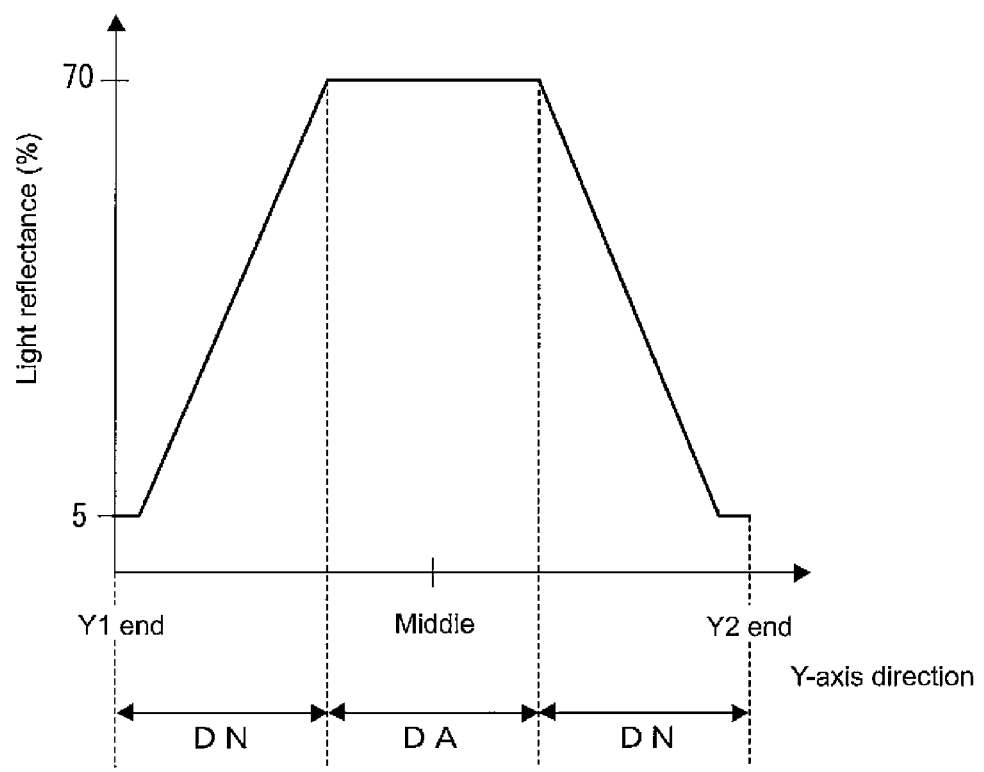
FIG. 18 is a graph illustrating a light reflectance change in the short-side direction of the light guide plate of the liquid crystal display device in FIG. 15.

FIG. 15 is a cross-sectional view illustrating a cross-sectional configuration of the liquid crystal display device according to a second embodiment. FIG. 16 is a plan view illustrating a configuration of the light guide plate provided in the liquid crystal display device in FIG. 15. FIG. 17 is a plan view explaining a light reflectance distribution on the second surface of the light guide plate. FIG. 18 is a graph illustrating a light reflectance change in the light guide plate.

The LED substrate 18 that forms the light source portion of the backlight device 12 is arranged in a portion of the chassis 14. More specifically, as illustrated in FIG. 15, a bottom plate 50 of the chassis 14 (a portion facing a light guide plate 60) is defined in the short-side direction equally in a first end portion 50A, a second end portion 50B that is located at an end opposite from the first end portion 50A and a middle portion 50C that is sandwiched between the first end portion 50A and the second end portion 50B. The LED substrate 18 is arranged in the middle portion 50C of the bottom plate 50 and a light source installation area LA is formed in the middle portion 50C. On the other hand, no LED substrate 18 is arranged in the first end portion 50A and the second end portion 50B of the bottom plate 50 and an empty area LN is formed in the first end portion 50A and the second end portion 50B. Namely, the LED substrate 18 is arranged in the middle portion 50C of the bottom plate 50 of the chassis 14 in the short-side direction to form the light source installation area LA. The light source installation area LA is smaller than (a half of) the total area of the empty areas LN. In the present embodiment, each of the first end portion 50A, the second end portion 50B and the middle portion 50C has an equal area (is equally defined). However, a ratio between the portions can be changed and accordingly, the area of the light source installation area LA and the area of the empty areas LN (an area ratio between the areas LA and LN) also can be changed. On the LED substrate 18, the light sources 17 are arranged in a hexagonal close-packed arrangement like the first embodiment and the light reflecting sheet 23 is provided. The arrangement of the LED light sources 17 and the light reflecting sheet 23 is same as the first embodiment and will not be explained.

In each of the empty areas LN of the bottom plate 50 of the chassis 14, that is, in each of the first end portion 50A and the second end portion 50B of the bottom plate 50, a convex reflecting portion (reflecting portion) 51 extends along the long-side direction of the bottom plate 50. The convex reflecting portion 51 is made of a synthetic resin and has a surface in white color that provides high light reflectivity. Each convex reflecting portion 51 has two sloped surfaces (directing surfaces) 51a, 51a that are sloped toward the bottom plate 50 and one of which faces the LED light sources 17. One sloped surface 51a directs light emitted from the LED light source 17 to the light guide plate 60.

A light source driving board 52 is arranged on an outer side of the bottom plate 50 of the chassis 14 (on an opposite side from the side where the LED light sources 17 are arranged), as illustrated in FIG. 15. The light source driving board 52 supplies drive power to the LED light sources 17. The light source driving board 52 is not formed over the entire length of the short-side direction of the bottom plate 50, and is arranged in the portion of the bottom plate 50 that overlaps the light source installation area LA, that is, the middle portion 50C of the bottom plate 50.

A configuration of the light guide plate 60 provided on the opening 14b side of the chassis 14 will be explained in details with reference to FIGS. 16 to 18. FIG. 16 is a plan view illustrating an enlarged general construction of the second surface of the light guide plate 60 facing the optical sheets 15b. FIG. 17 is a plan view explaining light reflectance distribution of the entire second surface of the light guide plate 60 in FIG. 16. FIG. 18 is a graph illustrating a light reflectance change in the short-side direction of second surface of the light guide plate 60 in FIG. 16. In FIGS. 16 to 18, the long-side direction of the light guide plate 60 is referred to as an X-axis direction and the short-side direction thereof is referred to as a Y-axis direction. In FIG. 18, a horizontal axis shows the Y-axis direction (short-side direction) and the light reflectance is plotted on a graph from the end closer to Y1 (Y1 end) to the middle portion and from the middle portion to the end closer to Y2 (Y2 end) in the Y-axis direction.

The light guide plate 60 is arranged to face the LED light sources 17 (LED substrate 18) and the bottom plate 50 of the chassis 14. As illustrated in FIG. 17, the middle portion of the light guide plate 60 in the short-side direction (Y-axis direction) corresponds to the portion that overlaps a light source installation area LA of the bottom plate 50 (referred to as alight source installation area overlapped portion DA). Each of the two end portions of the light guide plate 60 in the short-side direction corresponds to the portion that overlaps an empty area LN of the bottom plate 50 (referred to as an empty area overlapping surface DN).

The light reflecting portions 31 and the light scattering portions 32 having a dot pattern illustrated in FIG. 16 are formed on a second surface 60b of the light guide plate 60 facing the optical sheets 15b (a surface opposite from the one facing the cold cathode tubes 17). More specifically, in the light source installation area overlapped portion DA of the second surface 60b of the light guide plate 60, like the first embodiment, the light reflecting portion 31 is formed to overlap the LED light source 17 and the dot pattern is formed such that an area of each dot decreases as it is away from the LED light source 17. Each of the LED light sources 17 is arranged at equal intervals and the dot pattern of the light reflecting portions 31 is formed such that an area of each dot of the light reflecting portions 31 decreases as it is away from the LED light source 17 and the area of the dot is smallest in the middle portion between the adjacent LED light sources 17.

A dot pattern of the light scattering portions 32 is configured such that an area of each dot increases as it is away from the LED light source 17. Each of the LED light sources 17 is arranged at equal intervals and the dot pattern of the light scattering portions 32 is formed such that an area of each dot of the light scattering portion 32 increases as it is away from the LED light source 17 and the area of the dot is greatest in the middle portion between the adjacent LED light sources 17.

The above-described configuration of the dot pattern is a partial configuration in the light source installation area overlapped portion DA. An overall configuration of the dot pattern in the light source installation area overlapped portion DA and the empty area overlapping surface DN will be described below.

In the present embodiment, as illustrated in FIGS. 17 and 18, the light reflectance in the light source installation area overlapped portion DA of the second surface 60b of the light guide plate 60 (average light reflectance in the light source installation area overlapped portion DA) is 70%. In the empty area overlapping surface DN, as illustrated in FIG. 16, the area of each dot of the light reflecting portions 31 decreases and the light reflectance also decreases in a continuous manner in a direction away from the light source installation area overlapped portion DA (Y-axis direction). An area where no dot of the light reflecting portions 31 is formed is ensured in the portions farthest away from the light source installation area overlapped portion DA, that is, at the two end portions of the light guide plate 60 in the short-side direction. On the empty area overlapping surface DN of the second surface 60b of the light guide plate 60, an area of each dot of the light scattering portions 32 increases in a continuous manner in a direction away from the light source installation area overlapped portion DA (in the Y-axis direction). Namely, the light guide plate 60 is configured such that light is easily scattered at the two end portions of the light guide plate 60 in the short-side direction compared to the middle portion.

The light reflectance of the second surface 60b of the light guide plate 60 changes in the portions of the light guide plate 60 by changing an area of each dot (dot pattern) of the light reflecting portions 31 in the entire area of the chassis 14. In this embodiment, the light reflectance of the second surface 60b of the light guide plate 60 changes along the short-side direction (Y-axis direction) over the entire area of the light guide plate 60 as illustrated in FIGS. 17 and 18. The middle portion (middle portion of the Y-axis in FIG. 18) of the second surface 60b of the light guide plate 60 in the short-side direction (Y-axis) has the highest light reflectance of 70%. The light reflectance of the second surface 60b decreases toward the two end portions in the Y-axis direction. Each of the end portions (Y1 end and Y2 end of the Y-axis in FIG. 18) has the light reflectance of the light guide plate 15a itself that is 5%. Namely, on the second surface 60b of the light guide plate 60, the light source installation area overlapped portion DA has the highest light reflectance, and the light reflectance of the empty area overlapping surface DN is higher at the portion closer to the light source installation area overlapped portion DA and decreases in a continuous and gradual manner toward the portion farther therefrom.

As is explained above, according to the present embodiment, the chassis 14 included in the backlight device 12 is configured such that the bottom plate 50 facing the light guide plate 60 is defined in the first end portion 50A, the second end portion 50B and the middle portion 50C sandwiched between the first and second end portions 50A and 50B. The middle portion 50C corresponds to the light source installation area LA where the LED light sources 17 (LED board 18) are arranged and the first end portion 50A and the second end portion 50B correspond to the empty areas LN where no LED light source 17 (LED board 18) is arranged. Thus, compared to a case in which the LED light sources 17 (LED boards 18) are installed evenly in the entire chassis, the number of LED light sources 17 (LED boards 18) is reduced and a cost reduction and power saving of the backlight device 12 are achieved.

In the portion of the second surface 60b of the light guide plate 60 facing the LED light sources 17 that overlaps the light source installation area LA (light source installation area overlapped portion DA), the light reflecting portions 31 are formed in the portions that overlap the LED light sources 17. Further, in the portions of the second surface 60b that overlap the empty areas LN (empty area overlapping surface DN), an area of each dot of the light reflecting portions 31 decreases in a continuous manner from the portion closer to the light source installation area overlapped portion DA toward the portion away therefrom. As a result, on the second surface 60b of the light guide plate 60, the light source installation area overlapped portion DA has a light reflectance higher than the empty area overlapping surface DN. This suppresses brightness nonuniformity of illumination light from the backlight device 12.

As described above, if the empty area LN where no LED light source 17 (LED substrate 18) is arranged is provided, light is not output from the empty area LN. Therefore, the illumination light output from the backlight device 12 is dark at the portion corresponding to the empty area LN and this may cause uneven light distribution. However, according to the configuration of the present embodiment, light output from the light source installation area LA first reaches the light source installation area overlapped portion DA of the light guide plate 60 that is the portion having the relatively high light reflectance. Therefore, most of the light reflects off the light source installation area overlapped portion DA (does not pass through the light source installation area overlapped portion DA), and the brightness of illumination light is suppressed with respect to the light emission amount from the LED light sources 17. On the other hand, the light that reflects off the light source installation area overlapped portion DA further reflects off the first surface 60a of the light guide plate 60 and the reflecting sheet 23 and the like in the chassis 14 and the light reaches the empty area overlapping surface DN of the light guide plate 60. The light reflectance of the empty area overlapping surface DN is relatively low and a larger amount of light passes through the empty area overlapping surface DN and thus predetermined brightness of illumination light is achieved.

The light scattering portions 32 are formed on the empty area overlapping surface DN of the light guide plate 60. An area of each dot of the light scattering portions 32 increases in a continuous manner toward the portion away from the light source installation area overlapped portion DA. Accordingly, in the empty area overlapping surface DN, the light is easier to be scattered in the portion away from the light source installation area overlapped portion DA, that is the portion that the light less likely reaches. Therefore, the light entering the portion can be output from a wide area of the second surface 60b. As a result, the LED light sources 17 are not necessary to be installed in the entire chassis 14 to maintain the illumination light uniformity of the backlight device 12, and a cost reduction and power saving are achieved.

In the present embodiment, on the bottom plate 50 of the chassis 14, the light source installation area LA is smaller than the total area of the empty areas LN.

Even if the light source installation area LA is relatively small, the light reflecting portions 31 and the light scattering portions 32 are provided on the light guide plate 60 like the configuration of the present embodiment to execute the reflecting function and the scattering function in the light guide plate 60, and thereby, the light emitted from the LED light sources 17 can be directed toward the empty area overlapping surface DN that overlaps the empty area LN. This maintains uniformity of illumination brightness and greater effects can be expected in cost reduction and power saving.

In the present embodiment, the light source installation area LA is provided in the middle portion 30C of the bottom plate 50 of the chassis 14.

According to such a configuration, sufficient brightness is ensured in the middle portion of the backlight device 12 and the brightness at the middle portion of a display is ensured in the television receiver TV including the backlight device 12, and therefore good visibility can be obtained.

In the present embodiment, in the portion of the light guide plate 60 that overlaps the empty area LN (empty area overlapping surface DN), the light reflectance of the second surface 60b is higher in a portion closer to the portion of the light guide plate 60 that overlaps the light source installation area LA (light source installation area overlapped portion DA) than a portion farther from the light source installation area overlapped portion DA.

According to such a configuration, the light that reaches the empty area overlapping surface DN of the light guide plate 60 is relatively easily reflected in the portion closer to the light source installation area overlapped portion DA and the reflected light reaches the portion farther from the light source installation area overlapped portion DA. In the portion away from the light source installation area overlapped portion DA, the light reflectance is relatively low. Therefore, a larger amount of light passes therethrough and predetermined brightness of illumination light can be obtained. Therefore, the brightness of illumination light is set to substantially uniform in the empty area overlapping surface DN (empty area LN) and a moderate distribution of illumination brightness can be achieved in the backlight device 12.

Especially in the present embodiment, on the second surface 60b of the light guide plate 60, the light reflectance in the empty area installation area overlapping surface DN decreases in a continuous and gradual manner from the portion closer to the light source installation area overlapped portion DA to the portion away from the light source installation area overlapped portion DA.

The light reflectance in the empty area overlapping surface DN decreases in a continuous and gradual manner from the portion closer to the light source installation area overlapped portion DA to the portion away therefrom so as to have a gradation. This makes the distribution of illumination light brightness in the empty area overlapping surface DN (empty area LN) to be further moderate and the backlight device 12 can achieve a further moderate distribution of illumination light brightness.

In the present embodiment, the convex reflecting portions 51 having the sloped surfaces 51a that reflect (direct) the light emitted from the LED light sources 17 to the light guide plate 60 are provided in the empty areas LN of the bottom plate 50 of the chassis 14.

According to such a configuration, the light emitted from the LED light sources 17 that are arranged in the light source installation area LA can be reflected to the light guide plate 60 by the sloped surfaces 51a of the convex reflecting portions 51. Therefore, the emitted light is effectively used and it is further reliably suppressed that the empty areas LN are darkened.

The second embodiment of the present invention is described, however, the present invention is not limited to the above embodiment, and may include following modifications for example. In the following modifications, the same parts as the second embodiment are indicated by the same symbols and will not be illustrated and explained.

First Modification of Second Embodiment

Figure 19:
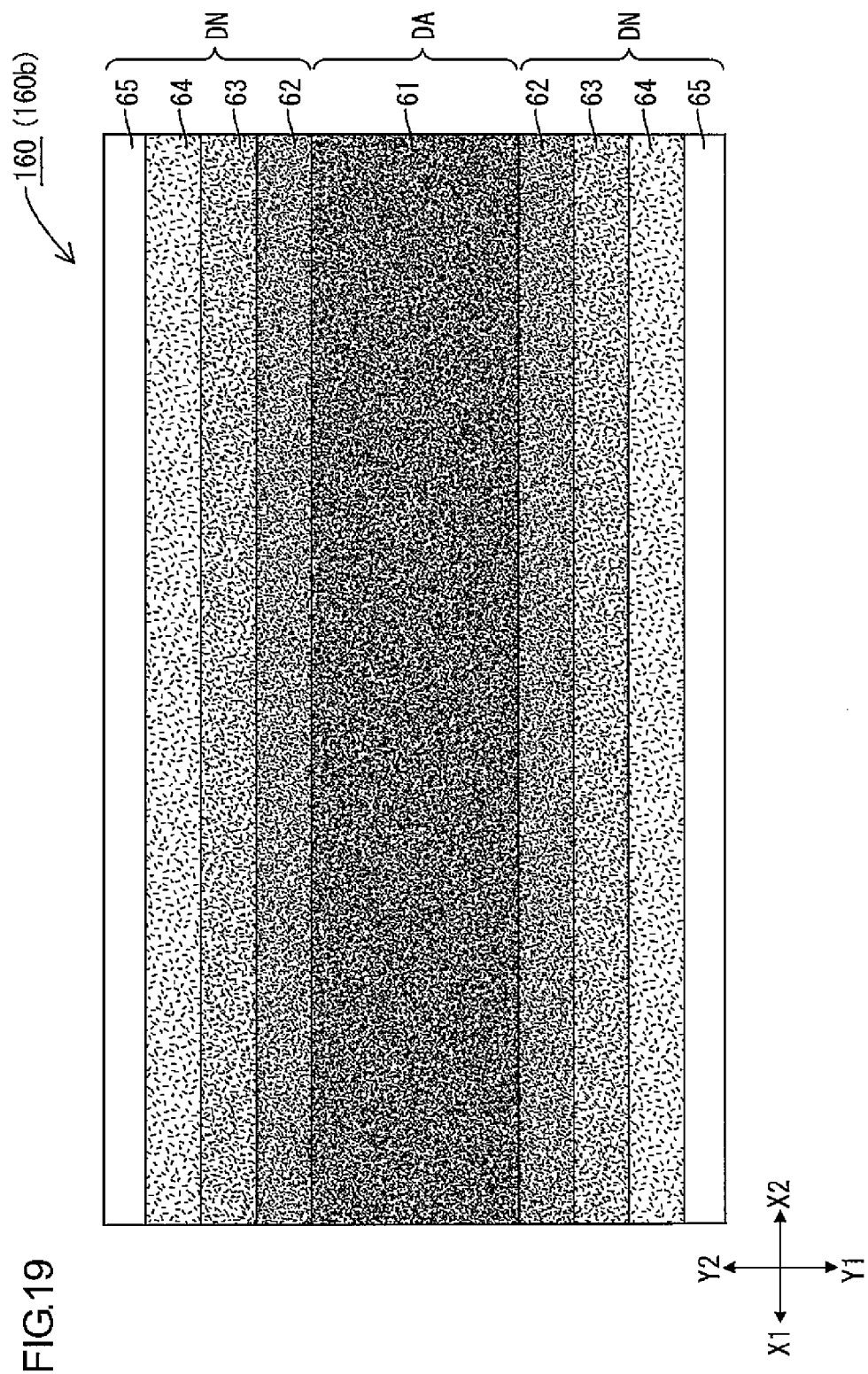
FIG. 19 is a plan view illustrating a light reflectance distribution on the entire second surface of the light guide plate according to a first modification of the second embodiment.
Figure 20:
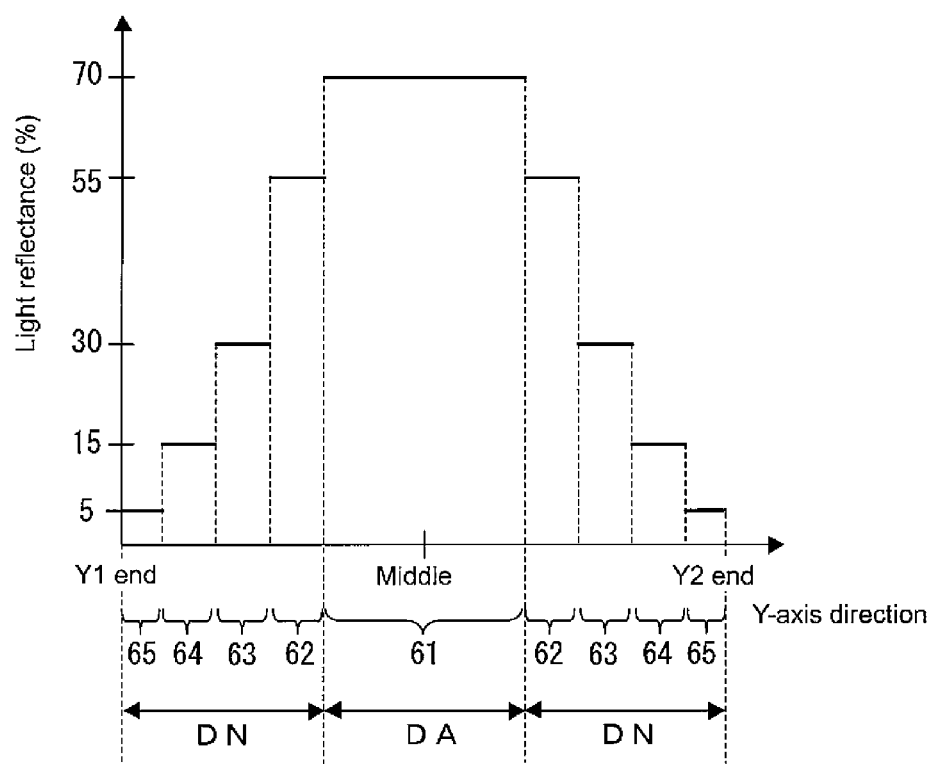
FIG. 20 is a graph illustrating a light reflectance change in the short-side direction of the light guide plate according to the first modification of the second embodiment.

One modification of the configuration of the light reflecting portions on the second surface 60b of the light guide plate 60 will be explained with reference to FIGS. 19 and 20. FIG. 19 is a plan view illustrating a light reflectance distribution on the entire second surface of the light guide plate. FIG. 20 is a graph illustrating a light reflectance change in the short-side direction of the light guide plate. In FIG. 20, a horizontal axis shows the Y-axis direction (short-side direction) and the light reflectance is plotted on a graph from the end closer to the Y1 (Y1 end) to the middle portion in the Y-axis direction and from the middle portion to the end closer to the Y2 (Y2 end).

The light reflecting portions 31 and the light scattering portions 32 having a dot pattern are formed on a surface of a light guide plate 160 facing the optical sheets 15b (a second surface 160b) (see FIG. 16). An area of each dot of the light reflecting portions 31 is largest at a position in the light source installation area overlapped portion DA (in the portion that overlaps the light source installation area LA) that overlaps the LED light source 17, and an area of each dot of the light reflecting portions 31 decreases in a stepwise manner in a direction away from the light source installation area overlapped portion DA. Since the light reflecting portions 31 thus formed, the light source installation area overlapped portion DA has the highest light reflectance in the entire second surface 160b of the light guide plate 160, as illustrated in FIGS. 19 and 20. In the portion of the light guide plate 160 that overlaps the empty area LN (empty area overlapping surface DN), the light reflectance decreases in a stepwise manner from the portion closer to the light source installation area overlapped portion DA toward the portion farther therefrom. In the light source installation area overlapped portion DN of the second surface 160b of the light guide plate 160, the light reflectance changes in a stripe pattern along the short-side direction (Y-axis direction) of the light guide plate 160.

More specifically, as illustrated in FIG. 19, a first area 61 having relatively high light reflectance is provided in the light source installation area overlapped portion DA that is located in the middle portion of the second surface 120b of the light guide plate 160, and second areas 62, 62 having light reflectance relatively lower than the first area 61 are provided next to the first area 61 in the empty area overlapping surface DN located at the sides of the first area 61. Further, in the empty area overlapping surface DN, third areas 63, 63 having light reflectance relatively lower than the second areas 62 are provided at the sides of the second areas 62, fourth areas 64, 64 having light reflectance lower than the third areas 63 are provided at the sides of the third areas 63, and fifth areas 65, 65 having light reflectance lower than the fourth areas 64 are provided at the sides of the fourth areas 64.

In this modification, as illustrated in FIG. 20, the light reflectance of the second surface 160b of the light guide plate 160 is 70% in the first area 61, 55% in the second area 62, 30% in the third area 63, 15% in the fourth area 64, and 5% in the fifth area 65. In the first area 61 to the fourth area 64, the area of each dot of the light reflecting portions 31 is changed to determine the above light reflectance, and the light reflectance in the fifth area 65 in which no light reflecting portion 31 is provided is represented by the light reflectance of the light guide plate 160.

A plurality of areas 62, 63, 64, 65 having different light reflectance are defined in the empty area overlapping surface DN of the second surface 160b of the light guide plate 160. The light reflectance is reduced from the second area 62 to the fifth area 65 sequentially in this order such that the light reflectance decreases in a stepwise manner from the portion closer to the light source installation area overlapped portion DA toward the portion farther therefrom.

According to such a configuration, the brightness distribution of illumination light in the empty area overlapping surface DN is made moderate. With the means for forming a plurality of areas 62, 63, 64, 65 having different light reflectance, a manufacturing method of the light guide plate 160 becomes simple and this contributes to a cost reduction.

Second Modification of Second Embodiment

Figure 21:
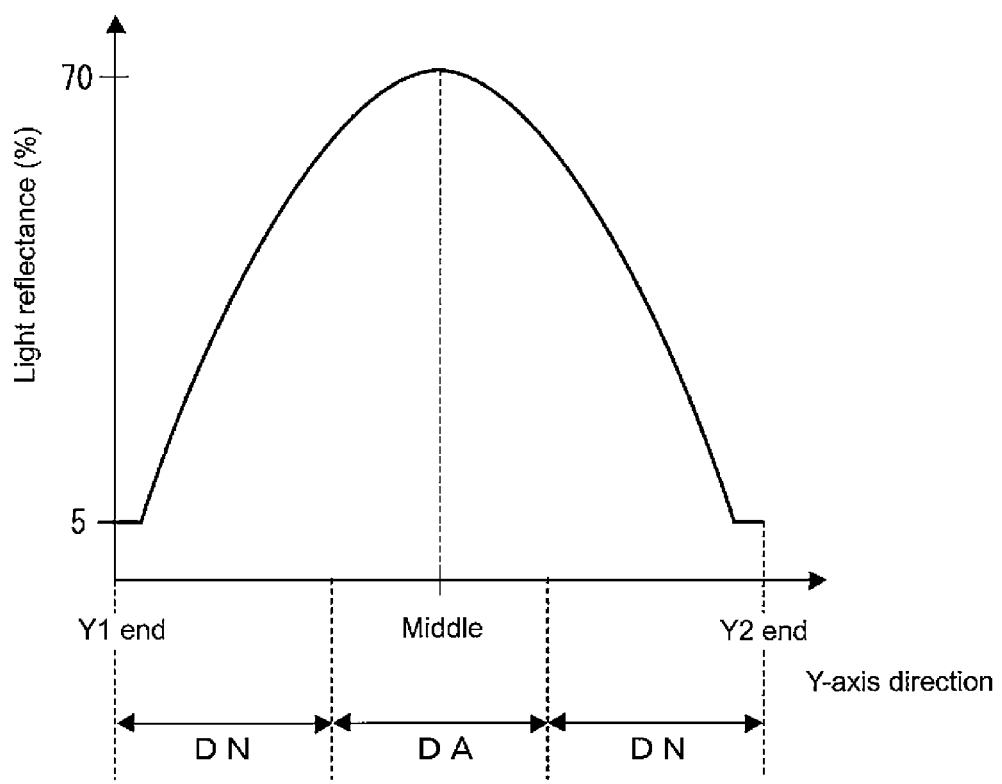
FIG. 21 is a graph illustrating a light reflectance change in the short-side direction of the light guide plate according to a second modification of the second embodiment.

Another modification of the configuration of the light reflecting portions on the second surface 60b of the light guide plate 60 may provide the light reflectance distribution illustrated in FIG. 21. FIG. 21 is a graph illustrating a light reflectance change in the short-side direction of the light guide plate.

Light reflecting portions 31 and the light scattering portions 32 having a dot pattern are formed on a surface of a light guide plate facing the optical sheets 15b (a second surface) similar to the second embodiment. An area of each dot of the light reflecting portions 31 is largest at a position in the light source installation area overlapped portion DA of the second surface of the light guide plate. An area of each dot of the light reflecting portions 31 decreases in a continuous manner in a direction away from the light source installation area overlapped portion DA (in the Y-axis direction). Especially in this modification, also in the light source installation area overlapped portion DA, an area of each dot is largest at a middle portion in the short-side direction (Y-axis direction) and decreases in a continuous manner toward the ends (borders between the light source installation area overlapped portion DA and the empty area overlapping surface DN).

Since the light reflecting portions 31 are thus formed, the second surface of the light guide plate has the highest light reflectance at a middle portion (illustrated by middle in FIG. 21) in the short-side direction (Y-axis direction), as illustrated in FIG. 21. The light reflectance decreases in a continuous and gradual manner toward the portion away from the middle portion. Namely, also in the light source installation area overlapped portion DA of the light guide plate, the light reflectance decreases from the middle portion to the ends along the Y-axis direction. In this modification, the light reflectance of the light guide plate is 70% in the middle portion in the short-side direction and is 5% at the ends Y1 and Y2, as illustrated in FIG. 21. The light reflectance of the light guide plate changes in a continuous manner between 70% and 5% from the middle portion to the two ends, as illustrated in FIG. 21.

According to such a configuration, the brightness distribution of illumination light is made moderate in the light guide plate and the backlight device 12 can obtain a moderate illumination brightness distribution. Such a configuration is especially preferable for the television receiver TV including the backlight device 12 that has high brightness in the vicinity of the middle portion of the display.

Third Modification of Second Embodiment

Figure 22:
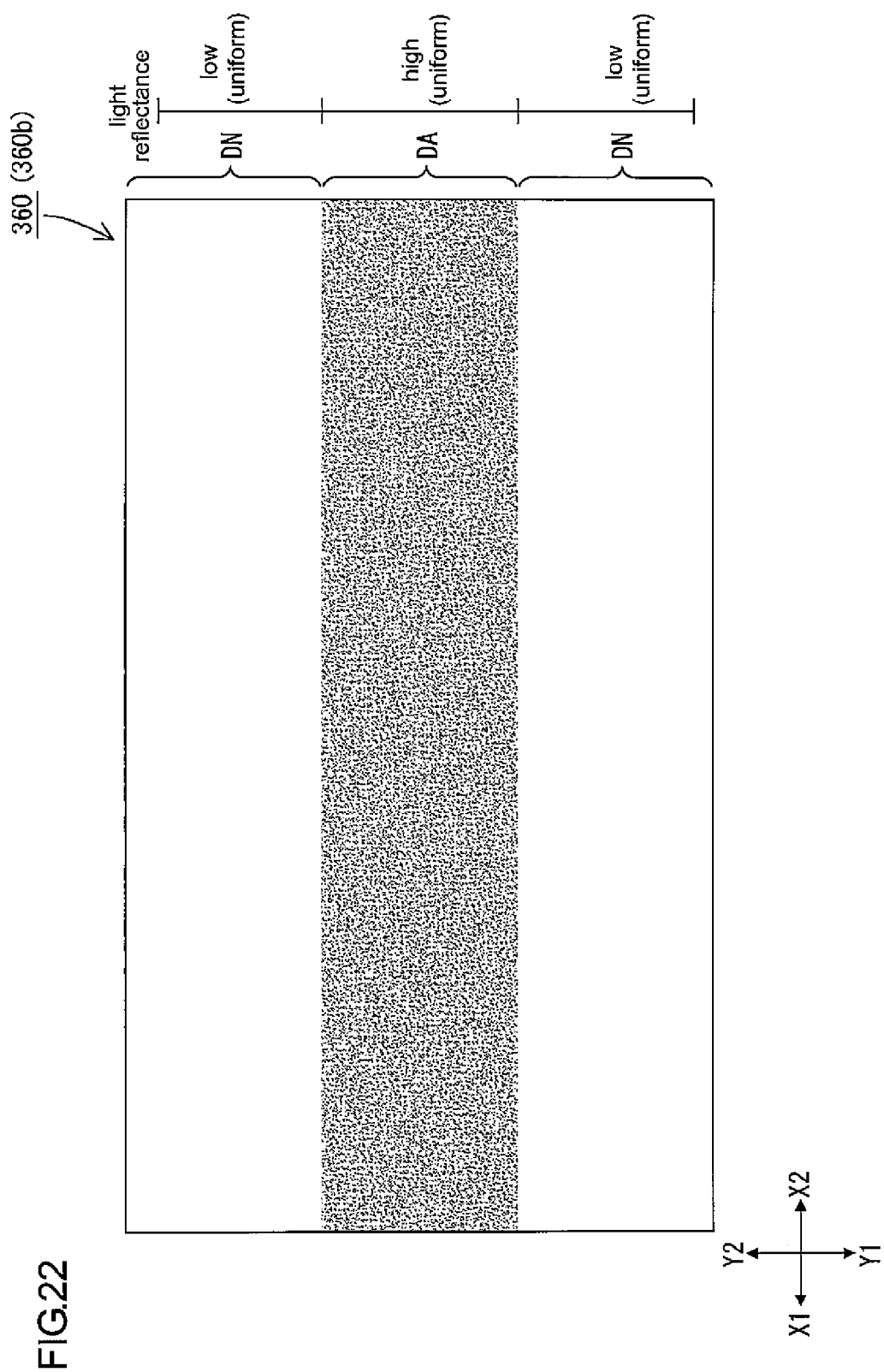
FIG. 22 is a plan view illustrating a light reflectance distribution on the entire second surface of the light guide plate according to a third modification of the second embodiment.
Figure 23:
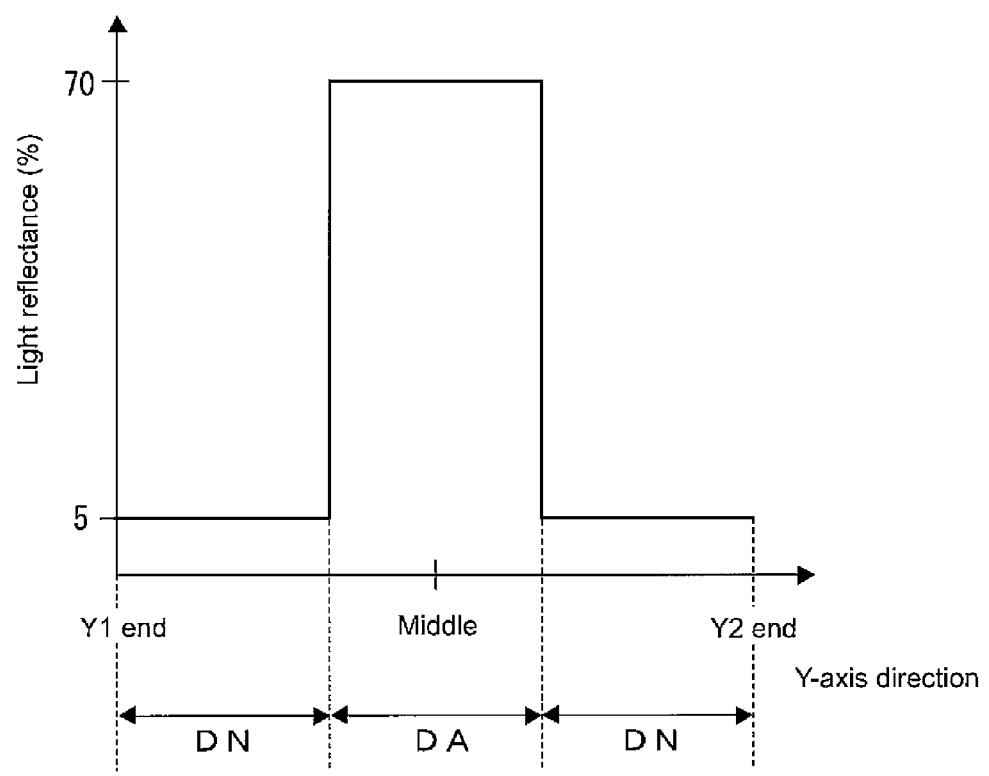
FIG. 23 is a graph illustrating a light reflectance change in the short-side direction of the light guide plate according to the third modification of the second embodiment.

Additional modification of the configuration of the light reflecting portions on the second surface 60b of the light guide plate 60 will be explained with reference to FIGS. 22 to 23. FIG. 22 is a plan view illustrating light reflectance of the entire second surface of the light guide plate of the present modification. FIG. 23 is a graph illustrating a light reflectance change in the short-side direction of the light guide plate of the present modification. In FIGS. 22 and 23, the long-side direction of the light guide plate is referred to as an X-axis direction and the short-side direction thereof is referred to as a Y-axis direction. In FIG. 23, a horizontal axis shows the Y-axis direction (short-side direction) and the light reflectance is plotted on a graph from the end closer to Y1 (Y1 end) to the middle portion in the Y-axis direction and from the middle portion to the end closer to Y2 (Y2 end).

Similar to the second embodiment, a light guide plate of this modification has light reflecting portions 31 and light scattering portions 32 formed in a dot pattern on a surface facing the optical sheets 15b (second surface 360b). The light reflecting portions 31 are formed only on the portions of the light source installation area overlapped portion DA that overlap the LED light sources 17. On the other hand, the light scattering portions 32 are formed on the portions of the second surface 360b of the light guide plate 360 that do not overlap the LED light sources 17. Especially on the empty area overlapping surface DN, an area of each dot increases in a continuous manner from the portion closer to the light source installation area overlapped portion DA toward the portion farther therefrom.

Since the light reflecting portions 31 are thus formed, the light reflectance of the second surface of the light guide plate is relatively high in the light source installation area overlapped portion DA and relatively low in the empty area overlapping surface DN, as illustrated in FIGS. 22 and 23. The light reflectance is uniform in the light source installation area overlapped portion DA and in the empty area overlapping surface DN. In this modification, as illustrated in FIG. 23, the light reflectance of the second surface of the light guide plate is 70% in the light source installation area overlapped portion DA that is located in the middle portion and the light reflectance is 5% in the empty area overlapping surfaces DN that are located at the two ends.

According to such a configuration, the light reflecting portions 31 are formed only in the middle portion of the second surface of the light guide plate. This simplifies a manufacturing method of the light guide plate and this contributes to cost reduction.

Third Embodiment

Next, a third embodiment of the present invention will be explained with reference to FIGS. 24 to 26. In the third embodiment, the arrangement of the LED light sources (LED substrate) and the configuration of the light guide plate are modified compared to the second embodiment, and other configurations are same as the second embodiment. The same parts as the second embodiment are indicated by the same symbols and will not be explained.

Figure 24:
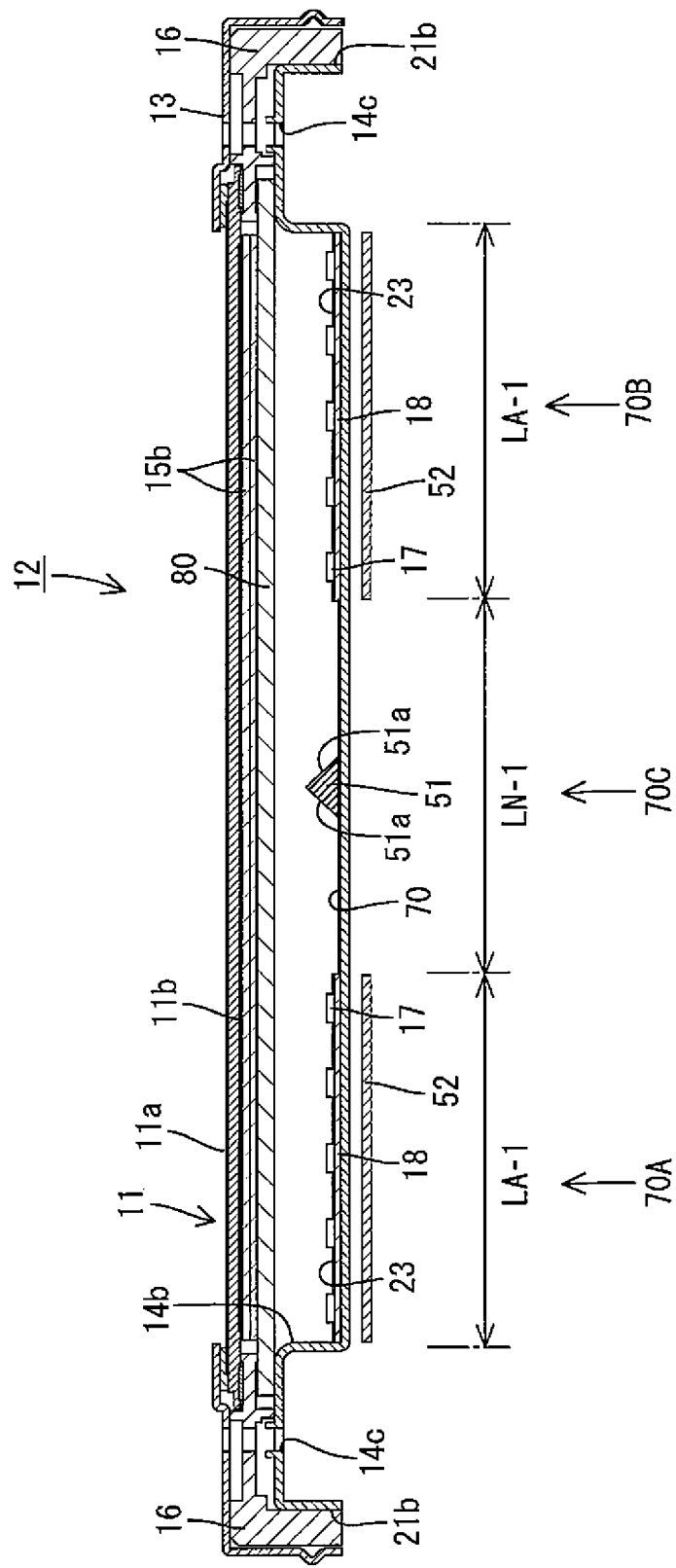
FIG. 24 is a cross-sectional view illustrating an arrangement configuration of the LED light sources (LED substrate) and the chassis provided in the liquid crystal display device according to a third embodiment.

FIG. 24 is a plan view illustrating a cross-sectional view illustrating an arrangement configuration of the LED light sources (LED substrate) and the chassis provided in the liquid crystal display device according to the third embodiment. FIG. 25 is a plan view illustrating light reflectance distribution of the entire second surface of the light guide plate included in the liquid crystal display device in FIG. 25. FIG. 26 is a graph illustrating a light reflectance change in the short-side direction of the light guide plate in FIG. 25. In FIGS. 25 and 26, the long-side direction of the chassis and the light guide plate is referred to as X-axis direction and the short-side direction thereof is referred to as Y-axis direction. In FIG. 26, a horizontal axis represents the Y-axis direction (short-side direction) and the light reflectance is plotted on a graph from the end closer to the Y1 (Y1 end) to the middle portion and from the middle portion to the end closer to the Y2 (Y2 end) in the Y-axis direction.

The LED light sources 17 (LED substrates 18) are arranged in portions of the chassis 14. More specifically, as illustrated in FIG. 24, a bottom plate 70 of the chassis 14 (a portion facing a light guide plate 80) is defined in the short-side direction equally in a first end portion 70A, a second end portion 70B that is located at an end opposite from the first end portion 70A and a middle portion 70C that is sandwiched between the first end portion 70A and the second end portion 70B. The same number of LED light sources 17 are arranged in the first end portion 70A and the second end portion 70B of the bottom plate 70 respectively and a light source installation area LA-1 is formed in the first end portion 70A and the second end portion 70B. On the other hand, no LED light source 17 is arranged in the middle portion 70C of the bottom plate 70 and an empty area LN-1 is formed in the middle portion 70C. Namely, the LED light sources 17 are arranged in the two end portions of the bottom plate 70 of the chassis 14 in the short-side direction to form the light source installation areas LA-1.

On the other hand, a light guide plate 80 is provided to face the bottom plate 70 of the chassis 14 and has portions that overlap the light source installation areas LA-1 (referred to as light source installation area overlapped portions DA-1) and a portion that overlaps the empty area LN-1 (referred to as a empty area overlapping surface DN-1). The light guide plate 80 has a first surface 80a facing the bottom plate 70 and a second surface 80b located on an opposite side from the first surface 80a. The light reflecting portions 31 and the light scattering portions 32 having a dot pattern are formed on the second surface 80b of the light guide plate 80. The arrangement pattern of the light reflecting portions 31 and the light scattering portions 32 in the light source installation area overlapped portions DA-1 and the empty area overlapping surface DN-1 is same as the second embodiment.

Figure 25:
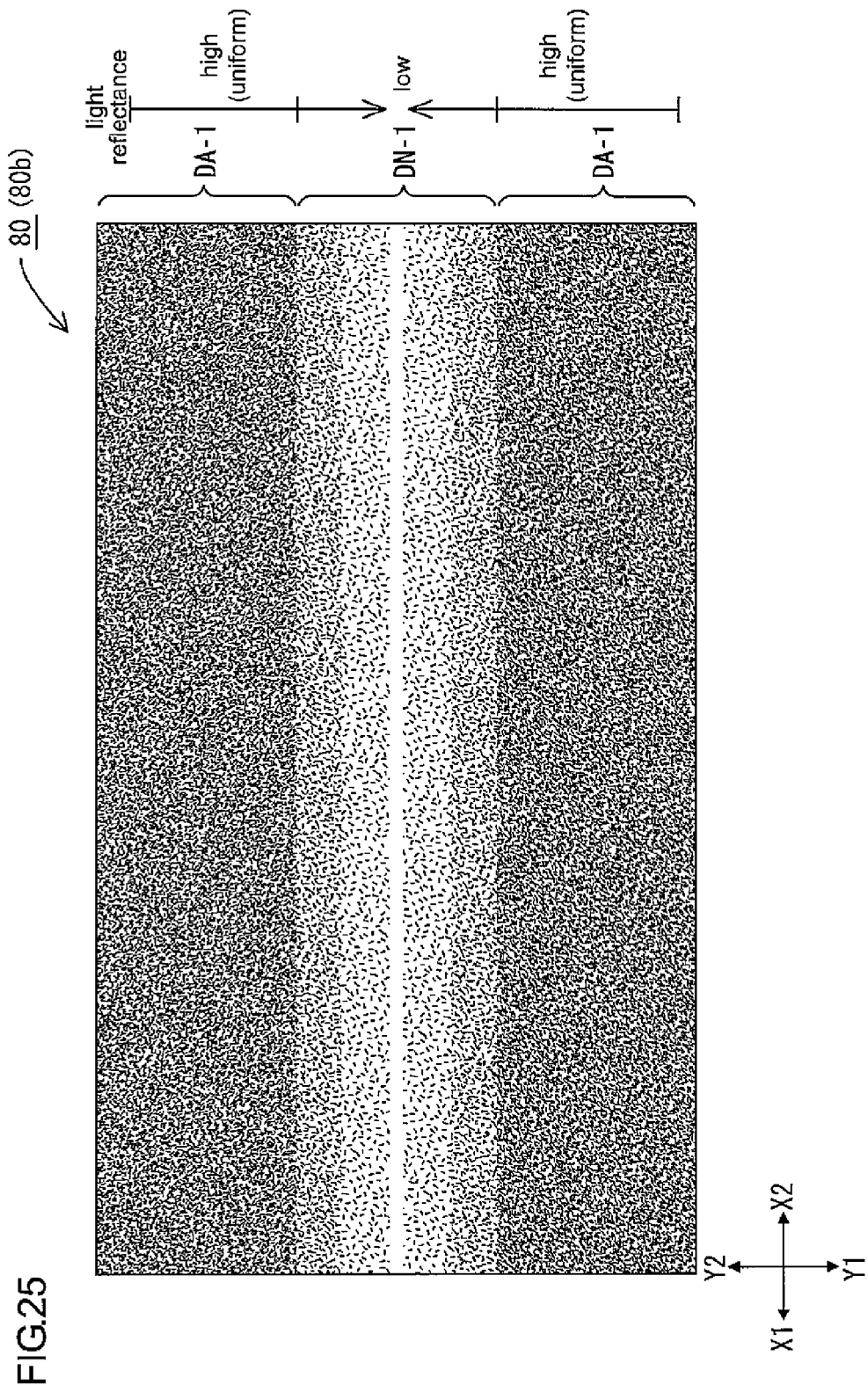
FIG. 25 is a plan view illustrating a light reflectance distribution on the entire second surface of the light guide plate provided in the liquid crystal display device according to the third embodiment.
Figure 26:
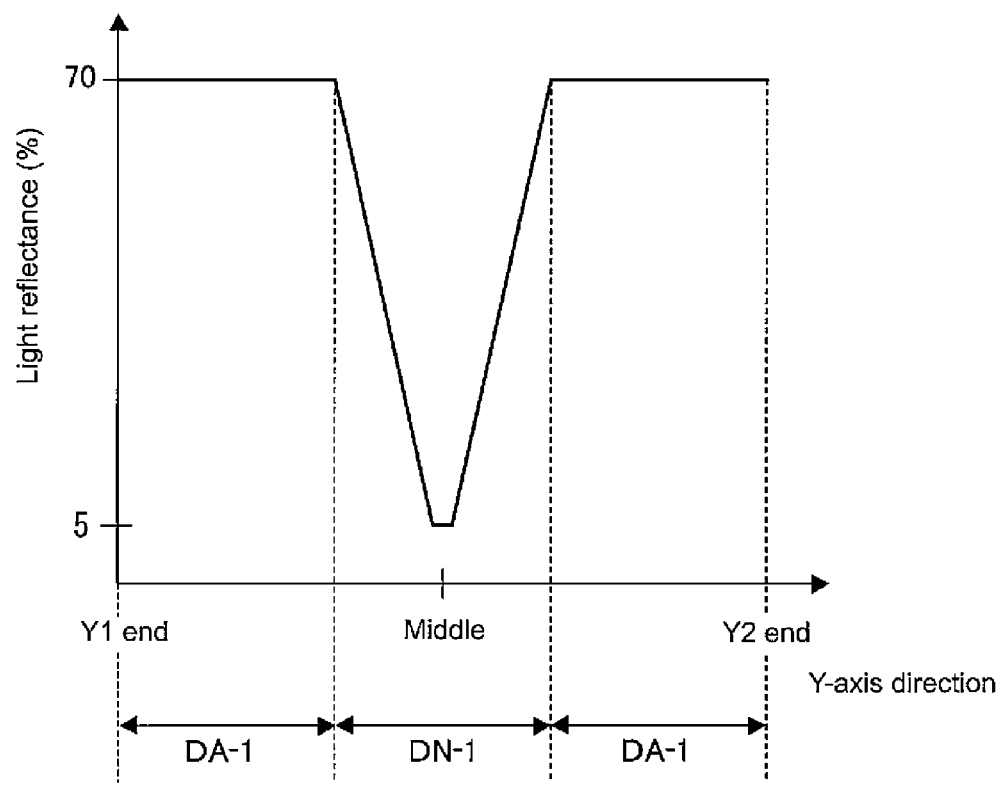
FIG. 26 is a graph illustrating a light reflectance change in the short-side direction of the light guide plate in FIG. 25.

The light reflectance of the second surface 80a of the light guide plate 80 changes along the short-side direction (Y-axis direction) in the entire light guide plate 80, as illustrated in FIGS. 25 and 26. Namely, on the second surface 80a of the light guide plate 80, the light reflectance of the light source installation area overlapped portion DA-1 is higher than the light reflectance of the empty area overlapping surface DN-1. More specifically, on the second surface 80a of the light guide plate 80, the light reflectance is 70% and uniform in the light source installation area overlapped portion DA-1 and it is a maximum value in the light guide plate 80. On the other hand, in the empty area overlapping surface DN-1 of the second surface 80a of the light guide plate 80, the light reflectance decreases in a gradual manner from the portion closer to the light source installation area overlapped portion DA-1 to the portion farther therefrom. The light reflectance is 5% that is a minimum value in the middle portion (center in FIG. 25) of the empty area overlapping surface DN-1 in the short-side direction (Y-axis direction).

As is explained above, according to this embodiment, in the chassis 14 included in the backlight device 12, the bottom plate 70 facing the light guide plate 80 is defined in the first end portion 70A, the second end portion 70B and the middle portion 70C that is sandwiched between the first and second end portions 70A, 70B. The first end portion 70A and the second end portion 70B correspond to the light source installation areas LA-1 where the LED light sources 17 are arranged, and the middle portion 70C corresponds to the empty area LN-1 where no LED light source 17 is arranged. Accordingly, compared to the case in that the LED light sources 17 (LED substrates 18) are evenly installed in the entire chassis, the number of LED light sources 17 is reduced and a cost reduction and power saving of the backlight device 12 are enabled.

Further, in this embodiment, the light source installation area LA-1 is provided in the first end portion 70A and the second end portion 70B of the bottom plate 70, and the light reflectance of the portion of the second surface 80a of the light guide plate 80 that overlaps the light source installation area LN-1 (light source installation area overlapped portion DA-1) is higher than the light reflectance of the portion that overlaps the empty area LN-1 (empty area overlapping surface DN-1).

According to such a configuration, light emitted from the light source installation areas LA-1 that are provided at the ends of the chassis 14 first reaches the light source installation area overlapped portions DA-1 of the light guide plate 80 that have relatively high light reflectance. Therefore, most of the light is reflected by the light source installation area overlapped portions DA-1. The reflected light reflects off the first surface 80a of the light guide plate 80 or the reflecting sheet 23 to be directed to the empty area overlapping surface DN-1. The light entering the empty area overlapping surface DN-1 is scattered by the light scattering portions 32 and output from a wide area. Therefore, in the empty area overlapping surface DN-1 of the light guide plate 80, the light is directed from two ends thereof and scattered. As a result, it is less likely to be happened that light is not supplied to the empty area overlapping surface DN-1 and is darkened. Additionally, the light reflectance of the empty area overlapping surface DN-1 is relatively low, and therefore a large amount of light passes therethrough. As a result, the empty area overlapping surface DN-1 (the empty area LN-1) is reliably prevented from being darkened. In the light source installation area overlapped portion DA-1, similar to the second embodiment (see FIG. 16), a dot pattern is formed so that the light reflectance decreases and the light scattering intensity increases toward the portion farther from the LED light sources 17, and the detailed explanation thereof will be omitted.

Fourth Embodiment

Next, a fourth embodiment of the present invention will be explained with reference to FIGS. 27 to 29. In the fourth embodiment, the arrangement of the LED light sources (LED substrate) and the configuration of the light guide plate are further modified compared to the third embodiment and other configurations are same as the second and third embodiments. The same parts as the second and third embodiments are indicated by the same symbols and will not be explained.

Figure 27:
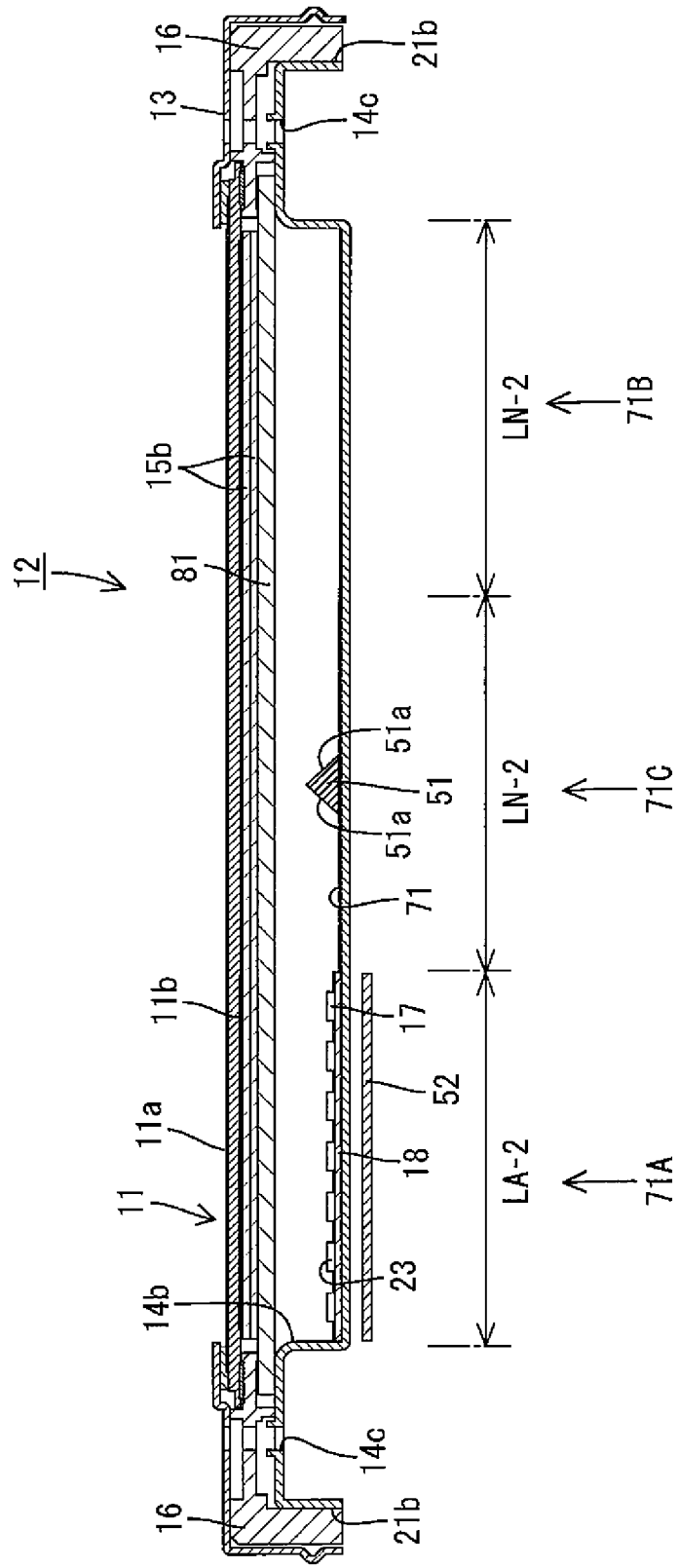
FIG. 27 is a cross-sectional view illustrating an arrangement configuration of the LED light sources (LED substrate) and the chassis provided in the liquid crystal display device according to a fourth embodiment.

FIG. 27 is a cross-sectional view illustrating an arrangement configuration of LED light sources (LED substrate) and a chassis provided in the liquid crystal display device according to the fourth embodiment. FIG. 28 is a plan view illustrating light reflectance distribution on the entire second surface of the light guide plate included in the liquid crystal display device. FIG. 29 is a graph illustrating a light reflectance change in the short-side direction of the light guide plate in FIG. 28. In FIGS. 28 and 29, the long-side direction of the chassis and the light guide plate is referred to as X-axis direction and the short-side direction thereof is referred to as Y-axis direction. In FIG. 29, a horizontal axis represents the Y-axis direction (short-side direction) and the light reflectance is plotted on a graph from the end closer to the Y1 (Y1 end) to the middle portion and from the middle portion to the end closer to the Y2 (Y2 end) in the Y-axis direction.

The LED light sources 17 (LED substrate 18) are arranged in a portion of the chassis 14 similar to the second and third embodiments. More specifically, as illustrated in FIG. 27, a bottom plate 71 of the chassis 14 (a portion facing a light guide plate 81) is defined in the short-side direction in a first end portion 71A, a second end portion 71B that is located at an end opposite from the first end portion 71A and a middle portion 71C that is sandwiched between the first end portion 71A and the second end portion 71B. The LED light sources 17 are arranged in the first end portion 71A of the bottom plate 71 and a light source installation area LA-2 is formed in the first end portion 71A. On the other hand, no LED light source 17 is arranged in the second end portion 71B and the middle portion 71C of the bottom plate 70 and an empty area LN-2 is formed there. Namely, the LED light sources 17 are arranged at one end of the bottom plate 70 of the chassis 14 (the end closer to Y1) to form a light source installation area LA-2.

The light guide plate 81 is provided to face the bottom plate 71 of the chassis 14 and has a portion that overlaps the light source installation area LA-2 (referred to as a light source installation area overlapped portion DA-2) and a portion that overlaps the empty area LN-2 (referred to as an empty area overlapping surface DN-2). The light guide plate 81 has a first surface 81a facing the bottom plate 71 and a second surface 81b that is located on an opposite side from the first surface 81a. The light reflecting portions 31 and the light scattering portions 32 having a dot pattern are formed on the second surface 81b of the light guide plate 81. The arrangement pattern of the light reflecting portions 31 and the light scattering portions 32 in the light source installation area overlapped portion DA-2 and the empty area overlapping surface DN-2 is same as the second and third embodiments.

Figure 28:
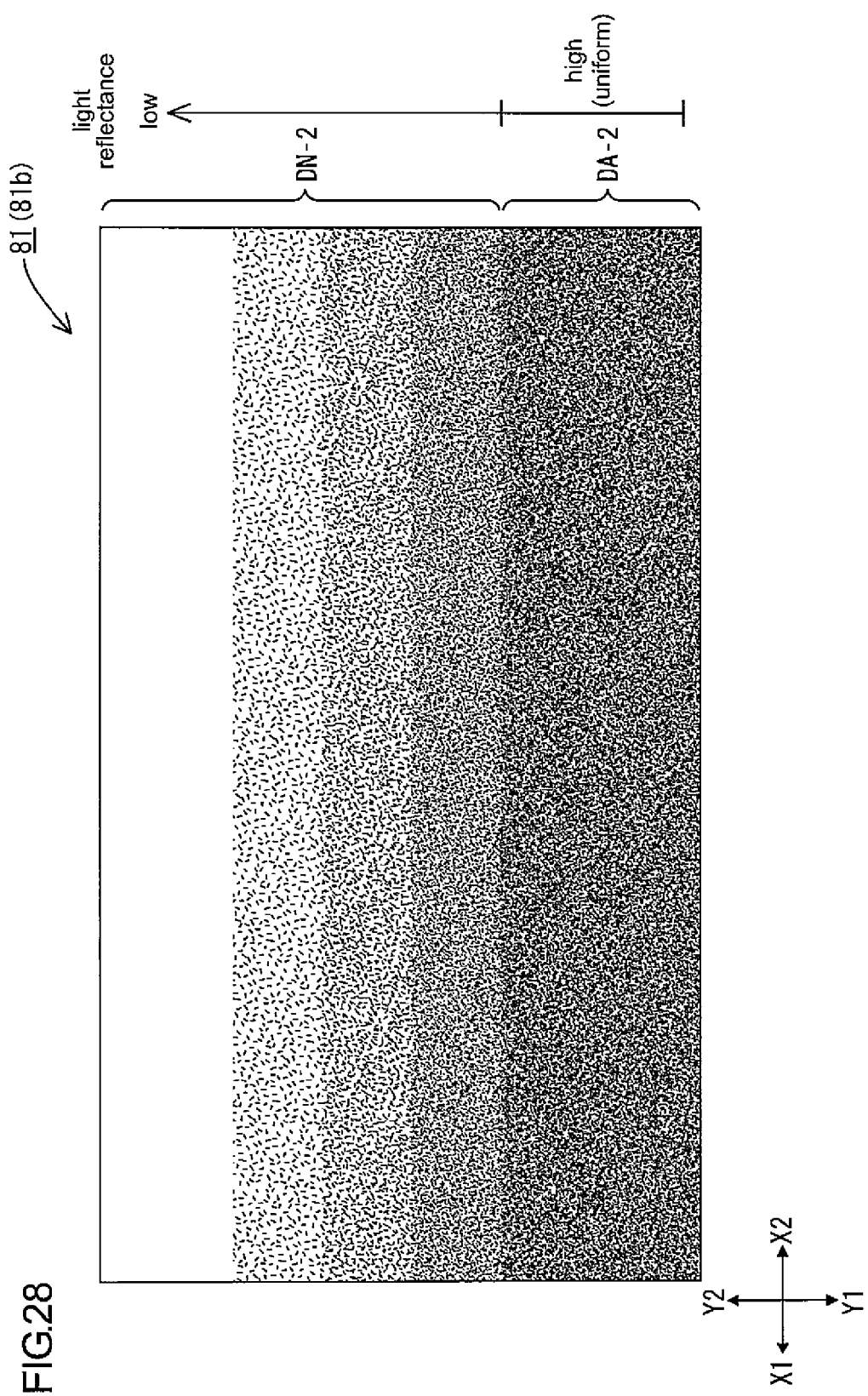
FIG. 28 is a plan view illustrating a light reflectance distribution on the entire second surface of the light guide plate provided in the liquid crystal display device according to the fourth embodiment.
Figure 29:
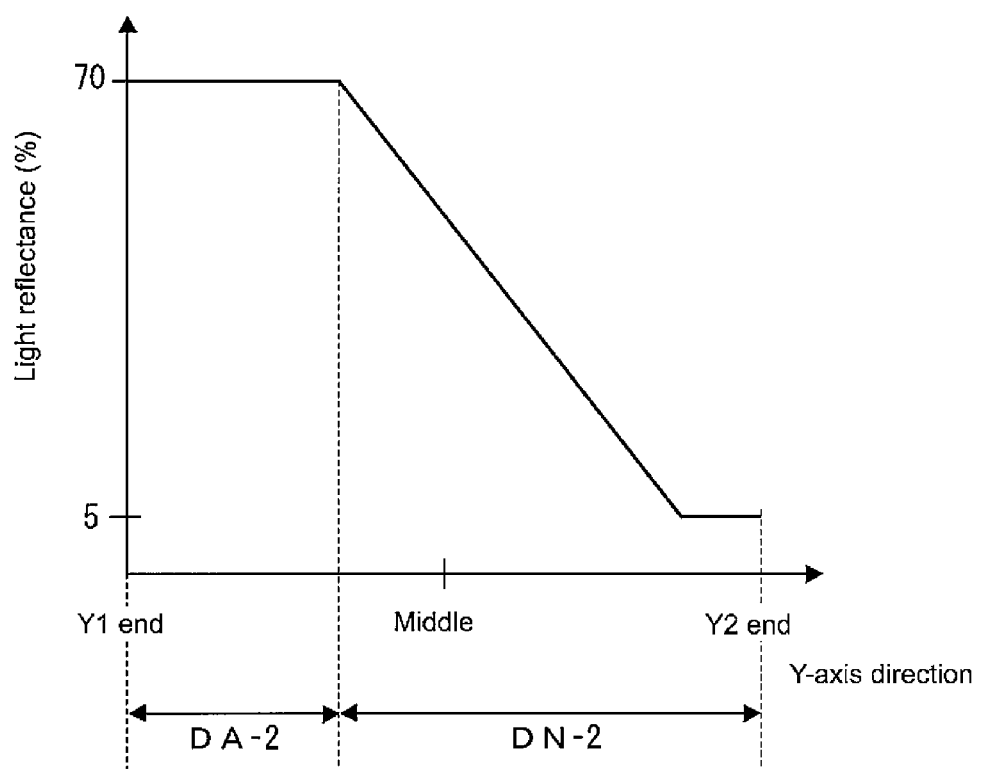
FIG. 29 is a graph illustrating a light reflectance change in the short-side direction of the light guide plate in FIG. 28.

The light reflectance of the second surface 81a of the light guide plate 81 changes along the short-side direction (Y-axis direction) as illustrated in FIGS. 28 and 29. Namely, on the second surface 81a of the light guide plate 81, the light reflectance of the light source installation area overlapped portion DA-2 is higher than the light reflectance of the empty area overlapping surface DN-2. More specifically, the light reflectance is 70% and uniform in the light source installation area overlapped portion DA-2 of the second surface 81a of the light guide plate 81 (one end of the light guide plate 81 in the short-side direction, the Y1 end in FIG. 29) and it is a maximum value in the light guide plate 81. On the other hand, in the empty area overlapping surface DN-2 of the second surface 81a of the light guide plate 81, the light reflectance decreases in a continuous and gradual manner from the portion closer to the light source installation area overlapped portion DA-2 toward the portion away therefrom. The light reflectance is 5% that is a minimum value at the other end of the light guide plate 81 (the Y2 end in FIG. 29) in the short-side direction.

As is explained above, according to this embodiment, in the chassis 14 included in the backlight device 12, the bottom plate 71 facing the light guide plate 81 is defined in the first end portion 71A, the second end portion 71B and the middle portion 71C that is sandwiched between the first and second end portions 71A, 71B. The first end portion 71A corresponds to the light source installation area LA-2 where the LED light sources 17 (LED board 18) are arranged, and the second end portion 71B and the middle portion 71C correspond to the empty areas LN-2 where no LED light source 17 (LED board 18) is arranged. Accordingly, compared to the case in that the LED light sources (LED boards 18) are evenly installed in the entire chassis, the number of LED light sources 17 (LED boards 18) is reduced and a cost reduction and power saving of the backlight device 12 are enabled.

Other Embodiments

The embodiments of the present invention have been described, however, the present invention is not limited to the above embodiments explained in the above description and the drawings. The following embodiments may be included in the technical scope of the present invention, for example.

Figure 30:
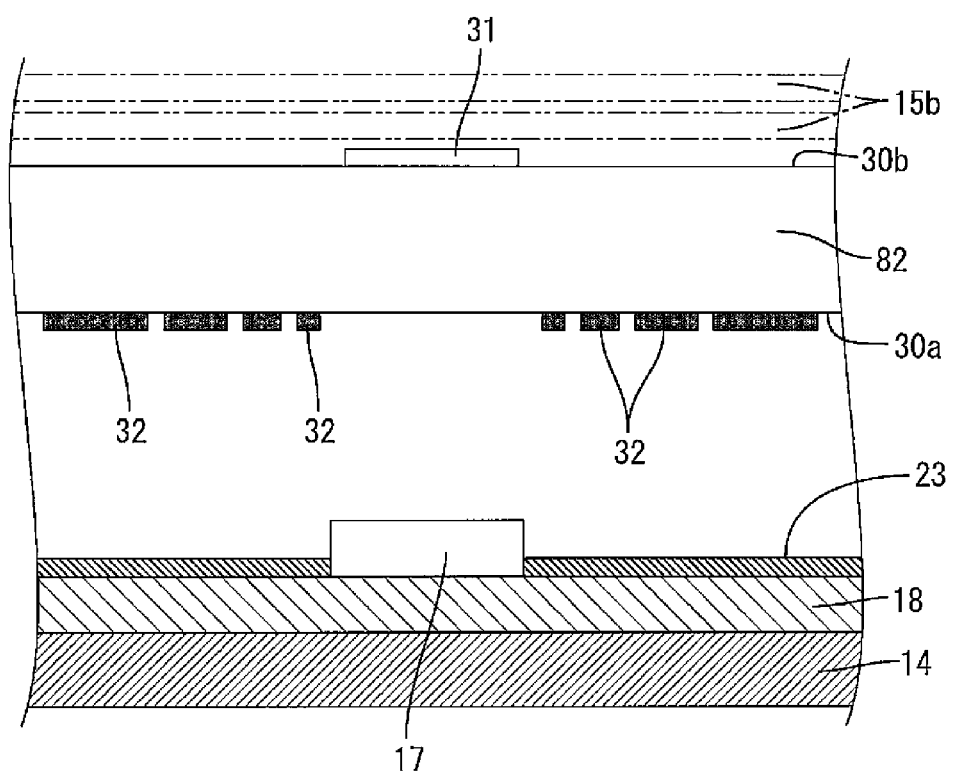
FIG. 30 is a typical view illustrating one modification of the configuration of the light scattering portions formed on the light guide plate.
Figure 31:
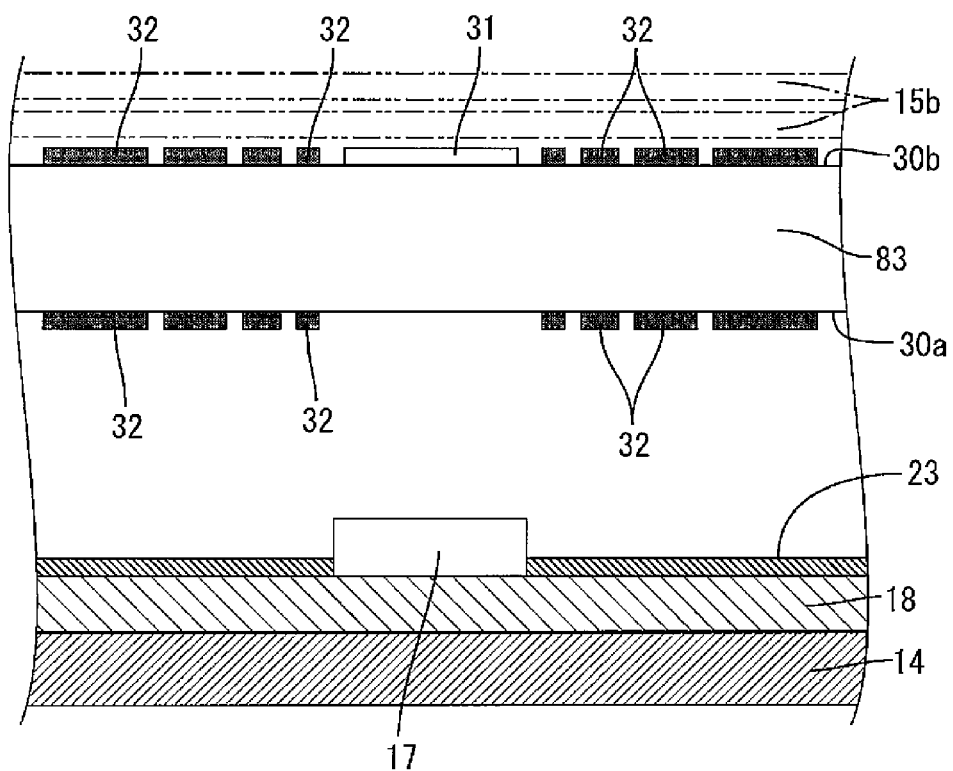
FIG. 31 is a typical view illustrating an additional modification of the configuration of the light scattering portions formed on the light guide plate.

(1) In the above embodiments, the light scattering portions are formed on a surface of the light guide plate facing the optical sheets (a surface opposite from one facing the LED light sources). The configuration of the light scattering portions is not limited thereto. For example, as illustrated in FIG. 30, the light scattering portions 32 may be formed on a first surface 30a of a light guide plate 82 facing the LED light sources 17 (LED substrate 18). Further, as illustrated in FIG.

31, the light scattering portions 32 may be formed on the first surface 30a and a second surface 30b of a light guide plate 83.

(2) In the above embodiments, each dot of the dot pattern of the light reflecting portions and the light scattering portions is formed in a round shape. However, the shape of each dot is not limited thereto but may be any shape such as a square or a polygonal shape.

(3) In the above embodiments, the light scattering portions are printed on the surface of the light guide plate, however, the light scattering portions may be formed by blasting the surface of the light guide plate to be roughened.

(4) In the above embodiments, the two diffuser sheets are layered as optical sheets on the light output side of the light guide plate. The present invention also includes a configuration in which optical sheets of arbitral combination of a diffuser sheet, a lens sheet and a reflective polarizing plate.

(5) In the above embodiments, the light source installation area is provided at the middle portion or at the ends of the bottom plate of the chassis. However, for example, the light source installation area may be provided at the middle portion and at one end of the bottom plate. Thus, the present invention includes a configuration in that the position of the light source installation area is changed according to the light amount from the LED light sources or conditions of use for the backlight device.

The invention claimed is:

1. A lighting device comprising:
at least one point light source;
an optical member provided on a light output side of the lighting device from the point light source, the optical member being a member having a substantially uniform light reflectance;
a first light reflecting portion arranged on a portion of the optical member that overlaps the point light source, the first light reflecting portion reflecting light from the point light source and being defined by a pattern having light reflectivity;
a light scattering portion arranged on a portion of the optical member that does not overlap the point light source, the light scattering portion scattering the light emitted from the point light source and being defined by a pattern having a light scattering property; and
a second light reflecting portion provided to reflect the light that is reflected by the first light reflecting portion to be directed to the first light reflecting portion; wherein
the pattern of the first light reflecting portion is configured such that an area of each portion of the pattern of the first light reflecting portion decreases in a direction away from the portion that overlaps the point light source, and
the pattern of the light scattering portion is configured such that an area of each portion of the pattern of the light scattering portion increases in a direction away from the portion of the first light reflecting portion that overlaps the point light source.

2. The lighting device according to claim 1, wherein:
the optical member has a first surface facing the point light source and a second surface opposite from the first surface; and
the first light reflecting portion is formed on the second surface of the optical member.

3. The lighting device according to claim 1, wherein:
the first light reflecting portion is provided on a portion of the optical member that does not overlap the point light source; and
on the surface of the optical member on which the first light reflecting portion is formed, the light reflectance of the surface of the portion of the optical member that overlaps the point light source is higher than the light reflectance of the surface of the portion of the optical member that does not overlap the point light source.

4. The lighting device according to claim 1, wherein the light reflectance of the surface of the optical member on which the first light reflecting portion is formed decreases in a direction away from the portion that overlaps the point light source.

5. The lighting device according to claim 1, wherein the first light reflecting portion is formed in a dot pattern having light reflectivity.

6. The lighting device according to claim 1, wherein the optical member has a first surface facing the point light source and a second surface opposite from the first surface; and
the light scattering portion is formed on the second surface of the optical member.

7. The lighting device according to claim 1, wherein the light scattering portion is formed in a dot pattern having light scattering property.

8. The lighting device according to claim 1, further comprising a light scattering member provided on a light output side of the optical member, the light scattering member scattering the light passing through the optical member.

9. The lighting device according to claim 1, wherein:
the point light source is arranged on a light source substrate;
the light source substrate has a surface facing the optical member and including at least a first end portion, a second end portion, and a middle portion, the second end portion being located at an end away from the first end portion, and the middle portion being located between the first end portion and the second end portion;
one or two of the first end portion, the second end portion and the middle portion are configured as light source installation areas in each of which the point light source is arranged, and the rest is configured as an empty area in which no light source is arranged.

10. The lighting device according to claim 1, further comprising a chassis housing the light source and having an opening for light from the light source to pass through, wherein:
the chassis has a surface facing the optical member and including at least a first end portion, a second end portion, and a middle portion, the second end portion being located at an end away from the first end portion, and the middle portion being located between the first end portion and the second end portion;
one or two of the first end portion, the second end portion and the middle portion are configured as light source installation areas in each of which the point light source is arranged, and the rest is configured as an empty area in which no point light source is arranged.

11. The lighting device according to claim 10, wherein the light source installation area of the chassis is smaller than the empty area.

12. The lighting device according to claim 10, wherein the light source installation area is provided in the middle portion of the chassis.

13. The lighting device according to claim 10, wherein the light source installation area is provided in one of the first end portion and the second end portion.

14. The lighting device according to claim 10, wherein the light source installation area is provided in each of the first end portion and the second end portion.

15. The lighting device according to claim 10, wherein the chassis includes a light reflecting member in the empty area, the light reflecting member having a directing surface for directing light from the point light source to the optical member.

16. The lighting device according to claim 9, wherein on the surface of the optical member on which the first light reflecting portion is formed, the light reflectance of at least the surface of the portion that overlaps the empty area is higher on a side close to the portion that overlaps the light source installation area than on a side away therefrom.

17. The lighting device according to claim 9, further comprising a light source driving board configured to supply driving power to the point light source, wherein the light source driving board is disposed so as to overlap the light source installation area.

18. A display device comprising:
   the lighting device according to claim 1; and
   a display panel configured to provide display using light from the lighting device.

19. The display device according to claim 18, wherein the display panel is a liquid crystal display panel using liquid crystal.

20. A television receiver comprising the display device according to claim 18.

* * * * *